(12) United States Patent
Ukuda et al.

(10) Patent No.: US 7,663,803 B2
(45) Date of Patent: Feb. 16, 2010

(54) LAMINATED DIFFRACTION OPTICAL ELEMENT

(75) Inventors: Hideo Ukuda, Yokohama (JP); Reiko Kubota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 12/015,148

(22) Filed: Jan. 16, 2008

(65) Prior Publication Data

US 2008/0174871 A1 Jul. 24, 2008

(30) Foreign Application Priority Data

Jan. 22, 2007 (JP) ............... 2007-011270
Dec. 10, 2007 (JP) ............... 2007-318480

(51) Int. Cl.
*G02B 5/18* (2006.01)
(52) U.S. Cl. .............. 359/576; 359/569; 359/566
(58) Field of Classification Search ........... 359/576, 359/566, 569, 571
See application file for complete search history.

(56) References Cited

U.S. PATENT DOCUMENTS

| 5,847,877 | A | 12/1998 | Imamura et al. ......... 359/566 |
| 6,394,613 | B1 | 5/2002 | Hatakeyama et al. ..... 359/507 |
| 6,759,471 | B1 * | 7/2004 | Ukuda ................. 524/497 |
| 6,870,677 | B2 | 3/2005 | Ohgane ................ 359/565 |
| 6,912,092 | B2 | 6/2005 | Ukuda ................. 359/642 |
| 7,031,078 | B2 | 4/2006 | Ukuda ................. 359/741 |
| 7,046,445 | B2 | 5/2006 | Ukuda ................. 359/576 |
| 7,286,293 | B2 * | 10/2007 | Tanaka ................ 359/576 |
| 7,554,733 | B2 * | 6/2009 | Tokoyoda ............. 359/576 |
| 2009/0052040 | A1 | 2/2009 | Suzuki et al. .......... 359/576 |

FOREIGN PATENT DOCUMENTS

| EP | 0 895 100 A2 | 2/1999 |
| EP | 1 065 531 A2 | 1/2001 |
| EP | 1 591 806 A1 | 11/2005 |
| WO | WO 2006/090614 A1 | 8/2006 |

OTHER PUBLICATIONS

A.D. Kathman and S.K. Pitalo, "Binary Optics in Lens Design," International Lens Design Conference, Spie vol. 1354, Jun. 1990, pp. 297-309.

May 26, 2008 European Search Report in European Patent Appln. No. 08000662.0.

Jul. 10, 2009 Chinese Official Action in Chinese Patent Appln. No. 200810005146.X (with translation).

* cited by examiner

*Primary Examiner*—Audrey Y Chang
(74) *Attorney, Agent, or Firm*—Fitzpatrick, Cella, Harper & Scinto

(57) ABSTRACT

A multi-layered diffraction optical element, comprises a transparent substrate, a first layer having a diffraction grating shape at least on one face and comprised of a relatively high refractive index and low dispersion material, and a second layer having a diffraction grating shape at least on one face and comprised of a relatively low refractive index and high dispersion material, wherein the first and second layers are laminated on the transparent substrate so that the respective diffraction grating shapes are mutually opposed to each other with no space therebetween, and, the first layer is comprised of a first organic resin including a first inorganic fine particle, and the second layer is comprised of a second organic resin including a second inorganic fine particle different from the first inorganic fine particle.

9 Claims, 21 Drawing Sheets

LAMINATED DIFFRACTION OPTICAL ELEMENT

BACKGROUND OF THE INVENTION

1. Field of the Invention

The present invention relates to multi-layered diffraction optical elements comprised of a low refractive index and high dispersion material and a high refractive index and low dispersion material which are laminated with no space between thereof.

2. Description of the Related Art

Heretofore, in general, a diffractive optical system using diffraction of light has combined lenses comprised of glass materials different in dispersion characteristics, thereby reducing chromatic aberration.

For example, in objective lenses such as a telescope, a glass material small in dispersion has been taken as a plus lens and a glass material large in dispersion as a negative lens, and by the combined use of these lenses, chromatic aberration appearing on an optical axis has been corrected. However, when the configuration and the number of lenses are restricted or when the glass materials to be used are limited, it has been often found difficult to sufficiently correct the chromatic aberration.

A non-Patent Document 1 (A. D. Kathman and S. K. Pitalo, "Binary Optics in Lens Design", International Lens Design Conference, 1990, SPIE Vol. 1354, p 297-309) discloses that a combined use of the diffraction optical element having a diffraction face and the diffraction optical element having a diffraction grating can reduce the chromatic aberration with a small number of lenses used.

This takes advantage of a physical phenomenon in which a refracting face and a diffracting face as the optical element are reversed in the generating direction of the aberration for the light of a reference wavelength. By changing a cycle of the diffraction grating continuously formed in the refraction optical element, a characteristic equivalent to an aspherical lens can be developed.

However, a piece of light entering the diffraction optical element is divided into a plurality of lights of each degree of order by a diffraction action. At this time, the diffraction light other than a design degree is image-formed at a place other than the light of the design degree, thereby to become a generating cause of flare.

U.S. Pat. No. 5,847,877 discloses that a refractive index dispersion of each optical element and a configuration of grating formed on a boundary surface of the optical element are optimized, so that a high diffraction efficiency is realized in a wide range of wavelengths. A light flux of the usable wavelength range is focused on a specific degree of order (hereinafter, referred to as a design degree), thereby to hold down the intensity of the diffraction light of other diffraction degree of orders and prevent flare from occurring.

U.S. Pat. No. 5,847,877 discloses that, in order to obtain a configuration having high diffraction efficiency in a wide range of wavelengths, a diffraction optical element formed by a material having relatively low refractive index dispersion and a diffraction optical element formed by a material having relatively high refractive index dispersion are combined to be used.

That is, higher a difference between the refractive index dispersions of the materials high and low in refractive index dispersion is, lower the thickness of diffraction grating of the optical element to be formed is, so that a field angel of the optical element becomes wider. Consequently, to correct the chromatic aberration with high accuracy, it is necessary to use the material having much higher (small in Abbe number) refractive index dispersion and the material having much lower (large in Abbe number) refractive index dispersion.

U.S. Pat. No. 7,031,078 discloses an optical material in which the relationship between a refraction index (nd) and an Abbe number (vd) is $nd > -6.667 \times 10^{-3} vd + 1.07$, and the relationship between a secondary dispersion ($\theta g, F$) of the refractive index and the Abbe number (vd) is $\theta g, F \leq -2vd \times 10^{-3} + 0.59$. By satisfying these formulas, refraction efficiency in the entire visible area can be improved.

The optical material in U.S. Pat. No. 7,031,078 is a composite material in which a transparent conductive metal oxide high in refractive index dispersion and showing a nature low in secondary dispersion characteristic is mixed and dispersed in binder resin as fine particles. As the transparent conductive metal oxide, a transparent conductive metal oxide such as ITO, ATO, $SnO_2$, or ZnO is disclosed.

The embodiments of U.S. Pat. No. 7,031,078 discloses also a laminated diffraction optical element in which a diffraction optical element comprised of a material having high refraction and high dispersion and a diffraction optical element comprised of a material having low refraction and low dispersion are oppositely disposed with a space provided between thereof.

On the other hand, a demand for miniaturization of a product has been extremely increased in the optical instrument using an optical element. Thus, the development for making the thickness of the optical element as thinly as possible has been underway. Hence, being developed is not the laminated diffraction optical element in which a space exists between the diffraction optical element of a first layer and the diffraction optical element of a second layer described in the above-mentioned, but a multi-layered diffraction optical element of the type in which, no space exists. U.S. Pat. No. 6,759,471 discloses a multi-layered diffraction optical element of the type in which no space exists.

However, in the optical element described in U.S. Pat. No. 6,759,471, a combination of a low refractive index and high dispersion material in which inorganic fine particles have been dispersed with a high refraction and low dispersion glass is used. Usually, coefficient of linear expansion of an organic resin is greater than that of a glass by one or two digits.

Further, the above difference between the coefficients of linear expansion is greatly correlative to a dependency of refraction index on temperature so that the refraction index difference between the organic resin and the glass considerably changes, depending on temperature changes to decrease the diffraction efficiency.

SUMMARY OF THE INVENTION

An object of the present invention is to provide a multi-layered diffraction optical element suppressed in distortion by an interface stress and suppressed in lowering of the diffraction efficiency by changes of the diffraction efficiency in the multi-layered diffraction optical element having high diffraction efficiency.

The present invention provides a multi-layered diffraction optical element in which, on the face of a transparent substrate, a first layer having at least a diffraction grating shape at one side and comprised of a relatively high diffraction and low dispersion material and a second layer having at least a diffraction grating shape at one side and comprised of a relatively low diffraction and high dispersion material are disposed by being laminated with no space provided between thereof, and the first layer is comprised of an organic resin including a first inorganic fine particle, and the second layer is comprised of an organic resin including a second inorganic fine particle different from the first inorganic fine particle.

The present invention provides a multi-layered diffraction optical element in which the refraction index of d line of the material having high refraction and low dispersion is taken as 1.54 or more and 1.63 or less, and the Abbe number is taken as 44 or more and 57 or less, and the refraction index of d line of the material having low refraction and high dispersion is taken as 1.48 or more and 1.57 or less, and the Abbe number is taken as 14 or more and 28 or less, and a difference of the refraction index of d line between the material having high refraction and low dispersion and the material having low refraction and high dispersion is taken as 0.024 or more and 0.075 or less.

The present invention is directed to a multi-layered diffraction optical element, comprising: a transparent substrate; a first layer having a diffraction grating shape at least on one face and comprised of a relatively high refractive index and low dispersion material; and a second layer having a diffraction grating shape at least on one face and comprised of a relatively low refractive index and high dispersion material, wherein the first and second layers are laminated on the transparent substrate so that the respective diffraction grating shapes are mutually opposed to each other with no space therebetween, and, the first layer is comprised of a first organic resin including a first inorganic fine particle, and the second layer is comprised of a second organic resin including a second inorganic fine particle different from the first inorganic fine particle.

The high refractive index and low dispersion material can have a refraction index of d line of 1.54 or more and 1.63 or less and the Abbe number of 44 or more and 57 or less, and, the low refractive index and high dispersion material has a refraction index of d line of 1.48 or more and 1.57 or less and the Abbe number of 14 or more and 28 or less, and, the difference in refraction index of d line between the high refractive index and low dispersion material and the low refractive index and high dispersion material is 0.024 or more and 0.075 or less.

In the multi-layered diffraction optical element, an average particle size of the first and second inorganic fine particles can be 1 nm or more and 100 nm or less. The first inorganic fine particle can be comprised of at least one type selected from Al, Zr, Y, Ga, La, and oxides and composites thereof, and has the refraction index of d line thereof of 1.70 or more and 2.5 or less, and the Abbe number of 30 or more and 90 or less. Alternatively, in the multi-layered diffraction optical element, a volume content of the first inorganic fine particle in the first layer can be 1 to 29 vol %.

The second inorganic fine particle can be a transparent conductive substance. The transparent conductive substance can be ITO.

The organic resin included in the first and second layers can be comprised of at least one type selected from acrylic resin, vinyl resin, and epoxy resin. The organic resin included in the first and second layers can be comprised of an ultraviolet-curing resin.

Further features of the present invention will become apparent from the following description of exemplary embodiments with reference to the attached drawings.

DESCRIPTION OF THE EMBODIMENTS

Exemplary embodiments of the present invention will be described below.

(Description of Diffraction Optical Element)

A representative entire configuration of the diffraction optical element of the present invention will be described by using FIGS. 1A and 1B.

Figure 1A:
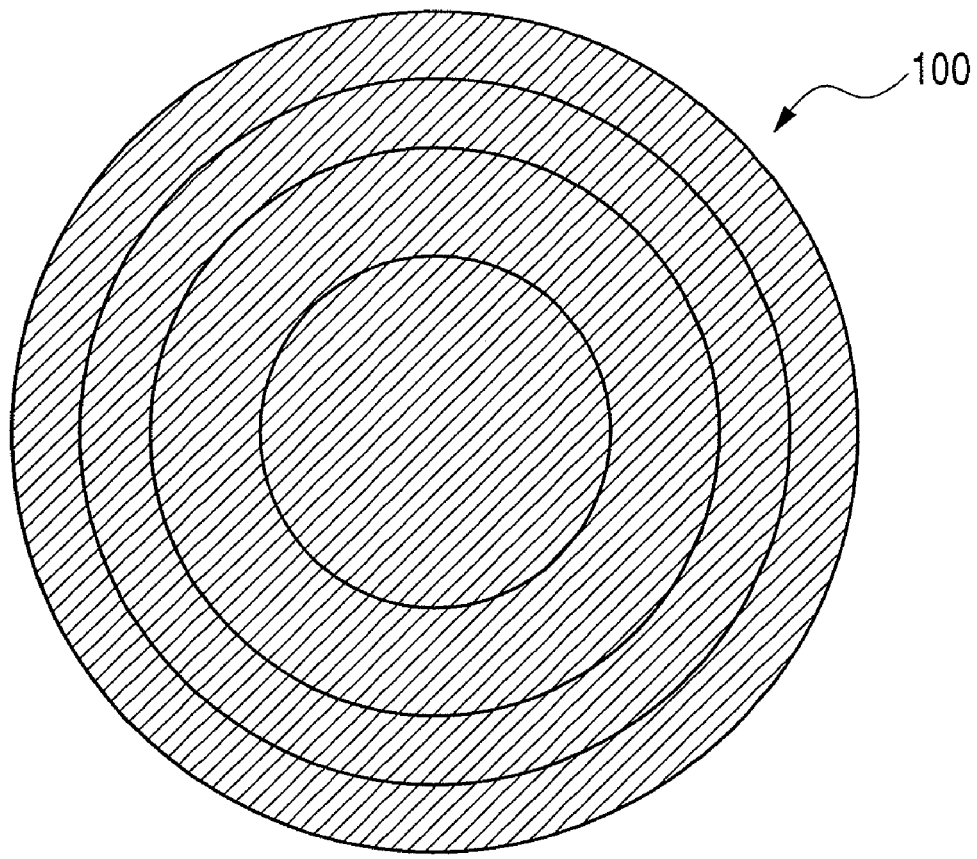
FIGS. 1A and 1B are schematic illustrations of a diffraction optical element.
Figure 1B:
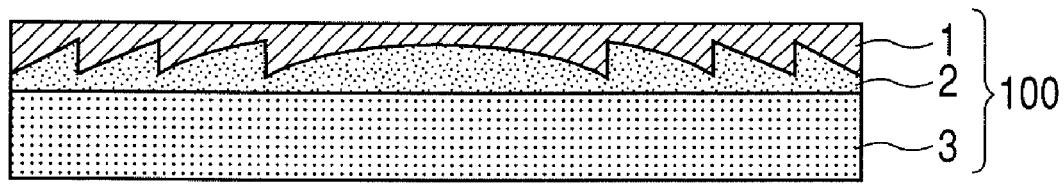

FIGS. 1A and 1B are a schematic illustration of a multi-layered diffraction optical element 100. FIG. 1A is an upper face view, and FIG. 1B is a cross-section. This diffraction optical element is configured to be laminated with a high refraction and low dispersion layer 2 having a diffraction grating shape and a low refraction and high dispersion layer 1 with no space provided between thereof on a transparent substrate layer 3 comprised of glass and plastic. The laminating order of the low refraction and high dispersion layer 1 and the high refraction and low dispersion layer 2 may be reversed. Both faces of the transparent substrate layer 3 may be flat or spherically shaped or non-spherically shaped.

To improve the diffraction efficiency of the optical element, it is necessary that the refraction index ($n_{d1}$) of d line of the low refraction and high dispersion layer 1 is larger than the refraction index ($n_{d2}$) of d line of the high refraction and low dispersion layer 2, and an Abbe number ($v_{d1}$) of the low refraction and high dispersion layer 1 is smaller than an Abbe number ($v_{d2}$) of the high refraction and low dispersion layer 2. The Abbe number referred to here is an indication showing an inclination of the refraction index in a visible light area (468.1 nm to 656.3 nm). The Abbe number (vd) is calculated by the following formula (1).

$$v_d = (n_d - 1)/(n_f - n_c) \qquad \text{formula (1)}$$

$n_d$: d line (587.6 nm) refraction index
$n_f$: f line (486.1 nm) refraction index
$n_c$: c line (656.3 nm) refraction index Description of High Refraction and Low Dispersion Layer 2

Next, a high refraction and low dispersion layer in an optical diffraction element of the present invention will be described.

Figure 2A:
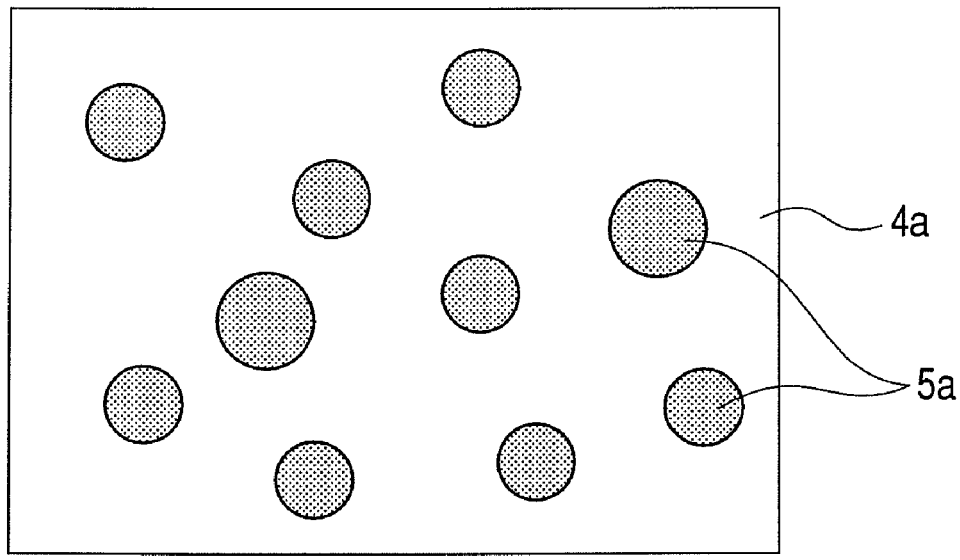
FIG. 2A is a schematic illustration showing a mixed state of an organic resin and an inorganic resin of a high refraction and low dispersion layer.

FIG. 2A is a cross section showing a high diffraction and low dispersion layer 2, in which an inorganic fine particle 5a is dispersed in an organic resin 4a. The organic resin 4a is preferably high in transparency, and it is preferable to use a material of one or more types selected from acrylic resin, vinyl resin, and epoxy resin. When the material has a desired characteristic, no limit is imposed on the detail of the type of the material, and the material may be either alone or a combined mixture of two types or more.

The refraction index ($n_{2d}$) of the organic resin 4a is preferably 1.50 or more, and the Abbe number ($v_{2d}$) is preferably 40 or more. When the refraction index and the Abbe number are extremely low, even if the inorganic fine particle is fed, the desired refraction index and Abbe number are achieved, a function as the high refraction and low dispersion layer cannot be displayed.

When the high refraction and low dispersion layer is intended to be easily cured, it is desirable to be an ultra violet type. For example, a resin ($n_d$=1.53, $v_d$=54) can be used, which is comprised of the mixture of an ultraviolet-curing acrylic resin (RC-C001; Dainippon Ink Kagaku Kogyou, $n_d$=1.52, $v_d$=52), acryl based monomer (KAYARAD684; NIPPON KAYAKU CO., LTD.), and an optional photo initiator.

The inorganic fine particle 5a is preferably 1 nm or more and 100 nm or less in average size, and when the average size is smaller than 1 nm, the thickening thereof is intensified when mixed with the organic resin 4a, thereby making it difficult to shape and form. When the average fine particle size is larger than 100 nm, the dispersion becomes large, and no desired optical characteristic can be obtained.

Since the inorganic fine particle 5a increases the refraction index of the resin layer, and makes the resin layer into a low dispersion layer, the refraction index $n_d$ of d line is preferably 1.70 or more and 2.5 or less, and the Abbe number $v_d$ is preferably 30 or more and 90 or less. The inorganic fine particle 5a is preferably selected from Al, Zr, Y, Ga, La, and oxides and composites of these elements, and may be the mixture of the elements of two types or more. Al, Zr and nano fine particles of the oxides of these elements are also placed on sale in the market, and in view of easiness of availability and production cost, these materials are preferable.

The shape of the inorganic fine particle 5a may be spherical or indeterminate, and as far as a desired characteristic can be obtained, no limit is imposed on the shape, but in view of improving the refraction index, the shape is preferable to have few fine pores. The face of the inorganic fine particle 5a may be also given a coating for increasing dispersibility, a dispersing agent processing, and a face treatment.

The refraction index ($n_{2d}$) of d line of the high refraction and low dispersion layer 2 allowing the inorganic fine particle 5a to be dispersed in the organic resin 4a is preferably 1.54 or more and 1.63 or less. The Abbe number ($v_{2d}$) showing wavelength dispersion in the visible area is preferably in the range of 44 or more and 57 or less.

A rate of content of the inorganic fine particle 5a in the high refraction and low dispersion layer 2 is preferably 1 vol % or more and 30 vol % or less, and is more preferably 5 vol % or more and 26 vol % or less. When this rate of content is excessively lower than 5 vol %, a control of the desired refraction index and the Abbe number becomes difficult, and when it is excessively higher than 26 vol %, the thickening becomes intensive at the adjustment time, thereby making it difficult to shape and form.

An average transmission coefficient for the wavelengths of 400 nm or more and 700 nm or less of the high refraction and low dispersion layer 2 is preferably 90% or more when the film thickness is 30 μm. The organic resin 4a may include an optional dispersing agent to improve dispersibility of the inorganic fine particle 5a. A rate of content of the dispersing agent is preferably in the range of obtaining a desired dispersing effect and not harming the characteristics required for the organic resin 4a, and specifically, the rate of the content is preferably 1.0% by mass or more and 10% by mass or less.

(Description of Low Refraction and High Dispersion Layer 1)

Next, a low refraction and high dispersion layer 1 in the optical diffraction element of the present invention will be described.

Figure 2B:
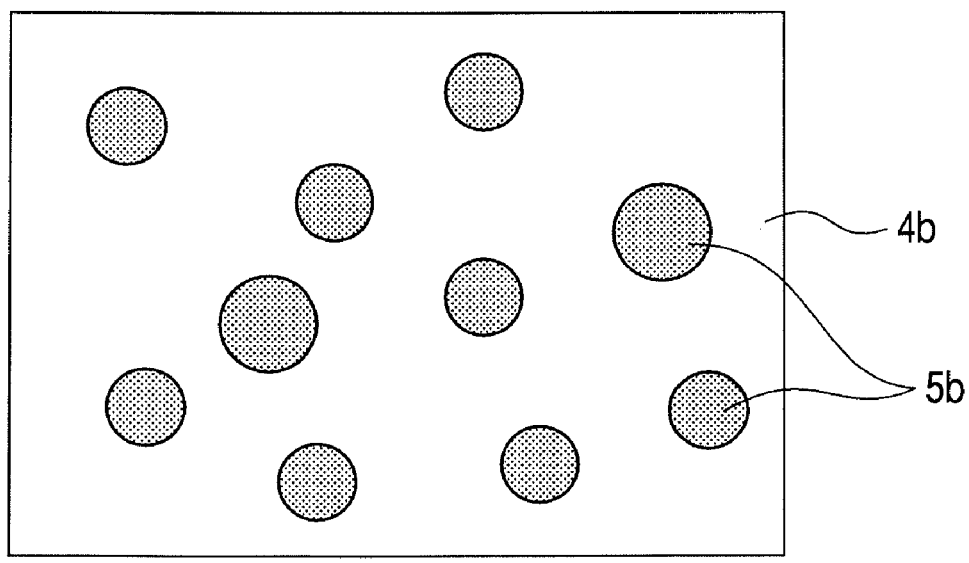
FIG. 2B is a schematic illustration showing a mixed state of an organic resin and an inorganic resin of a low refraction and high dispersion layer.

FIG. 2B is a schematic cross-section showing a low refraction and low dispersion layer 1, in which an inorganic fine particle 5b is dispersed in an organic resin 4b. The organic resin 4a is preferably high in transparency and low in refraction index, and it is preferable to use a material of one type or more selected from acryl based resin, acryl fluoride based resin, silicon based resin, and fluorine resin. When the material has a desired characteristic, no limit is imposed on the detail of the type of the material, and the material may be either alone or a combined mixture of the two types or more.

The refraction index ($n_{1d}$) of the organic resin 4b is preferably 1.53 or less. When the refraction index is extremely high, even if the inorganic fine particle is fed, the desired refraction index is not achieved, a function as the low refraction and high dispersion layer cannot be displayed. When the high refraction and low dispersion layer is intended to be easily cured, it is desirable to be an ultra violet type.

Since the inorganic fine particle 5b is mixed with the organic resin 4b so as to be made into low refraction and high dispersion, the dispersion is preferably as higher as possible. As one example of the inorganic fine particle 5b, ITO, ATO, AZO, FZO, $In_2O_3$, ZnO, SnO2, $TiO_2$, $NB_2O_5$, $Cr_2O_3$, and $BaTiO_3$ can be cited. Particularly, in view of the diffraction efficiency, the transparent conductive matter such as ITO, ATO, AZO, FZO, $In_2O_3$, ZnO, and SnO2 is preferable, and particularly, in view of a secondary dispersion characteristic as well as transparency, ITO is most preferable.

The inorganic fine particle 5b is preferably 1 nm or more and 100 nm or less in average particle size. When the average particle size is extremely small, the effect on the face of the fine particle reaches even inside the fine particle, so that the optical characteristic of the inorganic fine particle is lost. The increase in the face treatment agent brings about intensity of the thickening when mixed with the organic resin, thereby making it difficult to shape and form. When the average particle size is extremely large, the dispersion becomes large, and the desired optical characteristic cannot be obtained.

The refraction index ($n_{1d}$) of d line of the low refraction and high dispersion layer 1 is preferably 1.48 or more and 1.57 or less. The Abbe number ($v_{1d}$) showing the wavelength dispersion in the visible area is preferably in the range of 14 or more and 28 or less.

The rate of the content of the inorganic fine particle 5b is preferably 1 vol % or more and 30 vol % or less, and is more preferably 5 vol % or more and 23 vol % or less. When the rate of the content is extremely lower than 5 vol %, a control of the desired refraction index and the Abbe number becomes difficult, and when extremely higher than 23 vol %, the thickening is intensified at the adjustment time, thereby making it difficult to shape and form.

When the low refraction and high dispersion layer 1 is laminated on the high refraction and low dispersion layer 2 with no space provided between thereof, the difference between the refraction index ($n_{2d}$) of d line of the low refraction and high dispersion layer 1 and the refraction index ($n_{2d}$) of d line of the high refraction and low dispersion layer 2 is preferably 0.024 or more. When it is below 0.024, a flare coefficient is increased due to an optical element wall face and the like.

EXPERIMENTAL EXAMPLE (Adjustment and Estimation of Optical Material)

First, the high refractive index and low dispersion material used for the high refraction and low dispersion layer 2 and the low refractive index and high dispersion material used for the low refraction and high dispersion layer 1 in the present invention were manufactured in the following manner.

<Preparation and Estimation of High Refractive Index and Low Dispersion Material>

First, a mixture (refraction index nd after curing=1.53, vd=50) of slurry (average particle size: 3 nm) dispersed with zirconia 10 wt % in a toluene solution, and, as an ultraviolet-curing acrylic resin, tris(2-acryloxyethyl)isocyanurate 25 wt %, pentaerythritoltriacrylate 30 wt %, dicyclopentenyloxyethylmethacrylate 43 wt %, and 1-hydroxycyclohexylphenylketone 2 wt % were mixed. This mixed solution was put into an evaporator, and a pressure was gradually reduced from 100 hectopascal at 45° C. until it was brought to 2 hectopascal ultimately. The toluene solution was dispersed fully into the atmosphere by taking twelve hours, thereby fabricating high refractive index and low dispersion materials A1 to A5. The particle size of zirconia was measured by a particle size distribution meter of the laser system (ELS: made by Otsuka Denshi).

A volume fraction of the inorganic fine particle of the high refractive index and low dispersion materials A1 to A5 was A1 (23 v %), A2 (20 v %), A3 (18 v %), A4 (10 v %), and A5 (6 v %). While a material Z1 of 30 v % in volume fraction of the inorganic fine particle was also fabricated, it developed a high thickening in the midst of removing the solution, and therefore, the solution was not completely removed.

By replacing the types of the inorganic fine particle, high refractive index and low dispersion materials A6 to A8 were similarly fabricated. The inorganic fine particle used alumina (average particle size: 20 nm) for the high refractive index and low dispersion materials A6 to A8, and used a mixture (refraction index nd after curing=1.53, Abbe number vd=52) of Tricyclodecane dimethanol diacrylate 98 wt % and 1-Hydroxycyclohexylphenylketone 2 wt % for an ultraviolet-curing acrylic resin.

A volume fraction of the inorganic fine particle of the high refractive index and low dispersion materials A6 to A8 was A6 (26 v %), A7 (15 v %), and A8 (7 v %). In this case also, similarly to the zirconia dispersion resin, a material Z2 of 30 v % in volume fraction of the inorganic fine particle was also fabricated, but it developed a high thickening in the midst of removing the solution, and therefore, the solution was not completely removed. In Table 1, the inorganic fine particle, the material of the organic fine particle, and the mixture ratio of these materials in the high refractive index and low dispersion materials A1 to A9 are shown.

Preparation of Low Refractive Index and High Dispersion Material

First, slurry dispersed with ITO fine particle (15 to 20 nm) 10 wt % in xylene solution and an ultraviolet-curing acrylic resin (the refraction index nd after curing=1.52, the Abbe number vd=51) were mixed. This mixed solution was put into an evaporator, and a pressure was gradually reduced from 50 hectopascal at 45° C. until it was brought to 2 hectopascal ultimately. The xylene solution was dispersed fully into the atmosphere by taking sixteen hours, thereby preparing high refractive index and low dispersion materials L1 to L9.

A volume fraction of the inorganic fine particle of the low refractive index and high dispersion materials L1 to L9 was L1 (16.0 v %), L2 (14.1 v %), L3 (12.9 v %), L4 (7.9 v %), L5 (5.4 v %), L6 (7.6 v %), L7 (4.8 v %), L8 (2.9 v %), and L9 (8.7 v %). In Table 2, the materials of the inorganic fine particle and the organic resin as well as the mixture ratio of these materials in the low refractive index and high dispersion materials L1 to L9 are shown.

In replacement of the above described ultraviolet-curing acrylic resin (the refraction index nd after curing=1.52, the Abbe number vd=51), an ultraviolet-curing acryl base resin (the refraction index nd after curing 1.43, the Abbe number vd=61) was used, thereby preparing high refractive index and low dispersion materials T1 to T6.

A volume fraction of the inorganic fine particle of the low refractive index and high dispersion materials T1 to T6 was T1 (21.6 v %), T2 (17.3 v %), T3 (15.2 v %), T4 (14.8 v %), T5 (14.6 v %), and T6 (13.0 v %). In Table 3, the inorganic fine particle and the materials of the organic resin as well as the mixture ratio of these materials in the low refractive index and high dispersion materials T1 to T6 are shown.

Estimation of Optical Characteristic

Next, estimations of the optical characteristics of the high refractive index and low dispersion materials A1 to A9 and the low refractive index and high dispersion materials L1 to L9 were performed. The estimation of each optical characteristic was performed in the following manner.

Refraction Index

The refraction index of each optical element was measured by preparing samples as follows.

Figure 3:
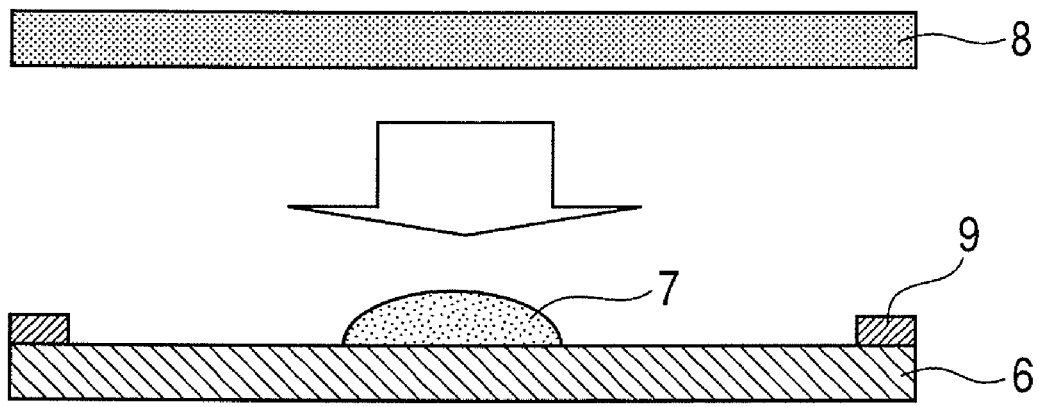
FIG. 3 is a schematic illustration showing a fabricating method of a sample for refraction index measurement.

First, as shown in FIG. 3, a spacer 9 of 50 μm in thickness and a high refraction index and low dispersion material 7 (A1 to A9) were disposed on a high refraction glass 6 of 1 mm in thickness. On that glass, quartz 8 of 1 mm in thickness was mounted via the spacer 9, thereby extending and spreading the high refraction index and low dispersion material 7 to be made as a sample. This sample was irradiated by a high pressure silver lamp (EXECURE 250, made by HOYA CANDEO OPTRONICS CO., LTD) under the conditions of 20 mW/cm² and 1000 seconds, thereby curing the sample. The cured sample was measured by using a refractometer (KPR-30, made by Shimadzu Corporation) for the refraction index of a line g 435.8 nm, a line f 486.1 nm, a line e 546.1 nm, d line 587.6 nm, and a line c 656.3 nm. From the measured refraction index, the Abbe number was calculated. In FIG. 1, the refraction index and the Abbe number of the high refractive index and low dispersion materials A1 to A9 are shown. As shown in Table 1, the refraction index of the high refractive index and low dispersion material A1 to A9 was 1.54 or more and 1.63 or less, and the Abbe number was 44 or more and 57 or less.

With respect to the low refractive index and high dispersion materials L1 to L9, by using the spacer of 12.5 μm in thickness, samples were prepared under the same conditions, and the refraction index was measured by the refractometer. In Table 2, the refraction index and the Abbe number of the high refractive index and low dispersion materials L1 to L9 are shown. As shown in Table 2, the refraction index of the low refractive index and high dispersion materials L1 to L9 was 1.53 or more and 1.57 or less, and the Abbe number was 19 or more and 39 or less.

Transmittance

The transmittance of each optical element was measured by preparing samples as follows.

Figure 4:
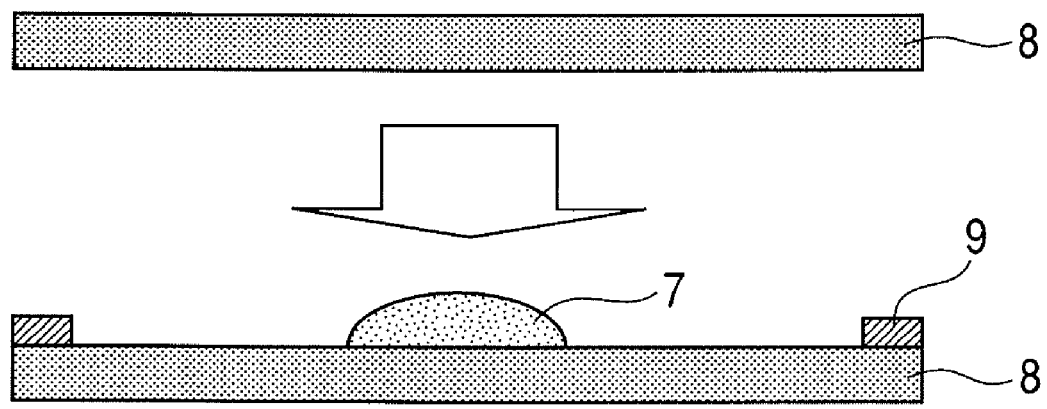
FIG. 4 is a schematic illustration showing a fabricating method of a sample for transmission coefficient measurement.

First, as shown in FIG. 4, a spacer 9 of 30 μm in thickness and the measured materials 7 (high refractive index and low dispersion materials (A1 to A9) and low refractive index and high dispersion materials (L1 to L9 and T1 to T6)) were disposed on a glass substrate 6a of 1 mm in thickness. On these materials and the spacer, a glass substrate 8a of 1 mm in thickness was mounted, thereby extending and spreading the high refractive index and low dispersion materials 7 to be made as a sample. This sample was irradiated by a high pressure silver lamp (EXECURE 250, made by HOYA CANDEO OPTRONICS CO., LTD) under the conditions of 20 mW/cm² and 1000 seconds, thereby curing the sample. The cured sample was measured by a spectral photometer (U4000, made by Hitachi Seisakusho) for transmittance up to 400 nm to 800 nm at the intervals of 10 nm, and its average value was calculated.

In Table 1, the transmittance of the high refractive index and low dispersion materials A1 to A9 is shown. As shown in Table 1, the transmittance of the high refractive index and low dispersion materials A1 to A9 is 96% or more, and it has shown a good permeability. Usually, when the transmittance is 90%, it can be said that a good transmittance is shown. With respect to the low refractive index and high dispersion materials L1 to L9 and T1 to T6, sufficient transmittance was shown as the optical elements.

Estimation of Shape Transferability

Shape transferability of each optical element was measured by preparing samples as follows.

Figure 5:
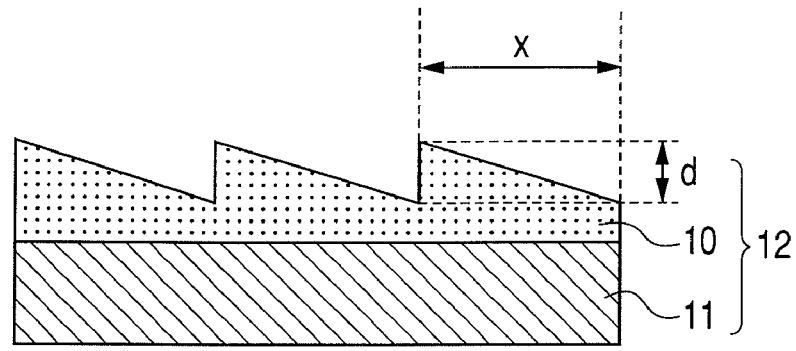
FIG. 5 is a schematic illustration of a partially enlarged cross section of an estimation mold.

FIG. 5 is a schematic illustration of a partially enlarged cross section of an estimation mold 12. As shown in FIG. 5, the estimation mold 12 is comprised of a mold base material layer 11 serving as a foundation layer and a plated layer 10 having a grating shape of the upper layer. The shape of the plated layer 10 is a groove height d=14 μm and a pitch X=80 μm, and a face roughness Ra is 2 nm or less.

Figure 6:
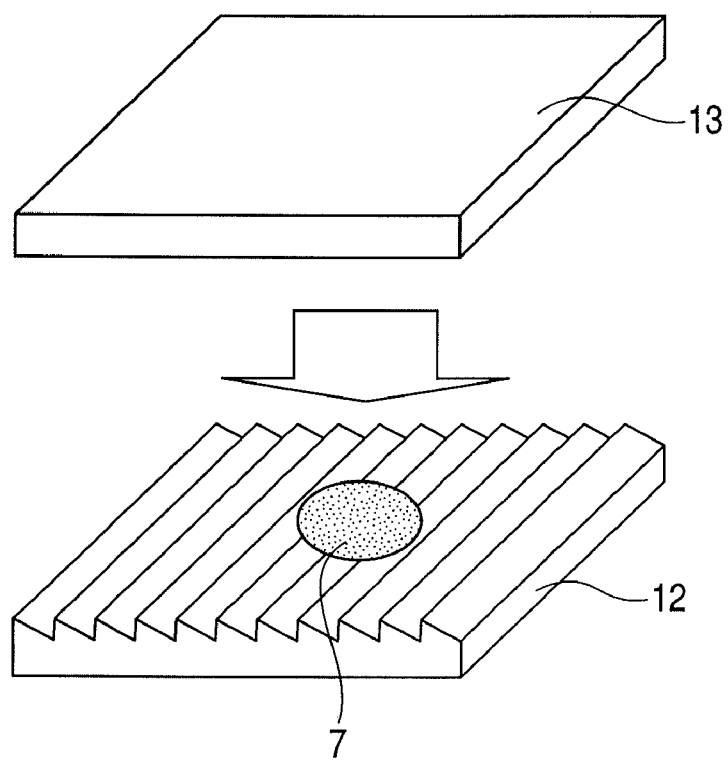
FIG. 6 is a schematic illustration showing a fabricating method of the estimation sample having shape transferability.
Figure 7A:
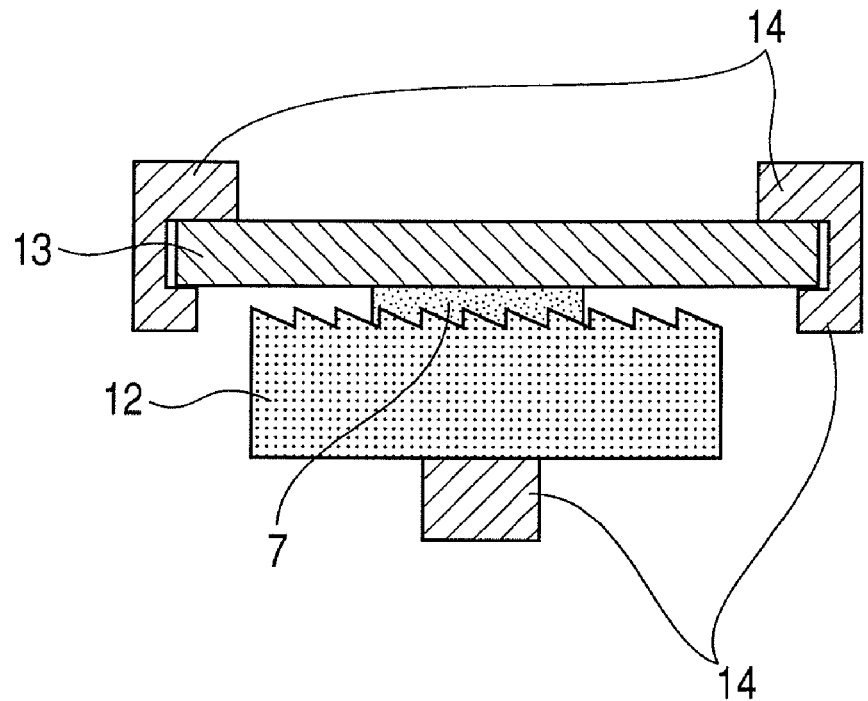
FIGS. 7A and 7B are schematic illustration showing a mold-releasing method of the estimation sample having shape transferability.
Figure 7B:
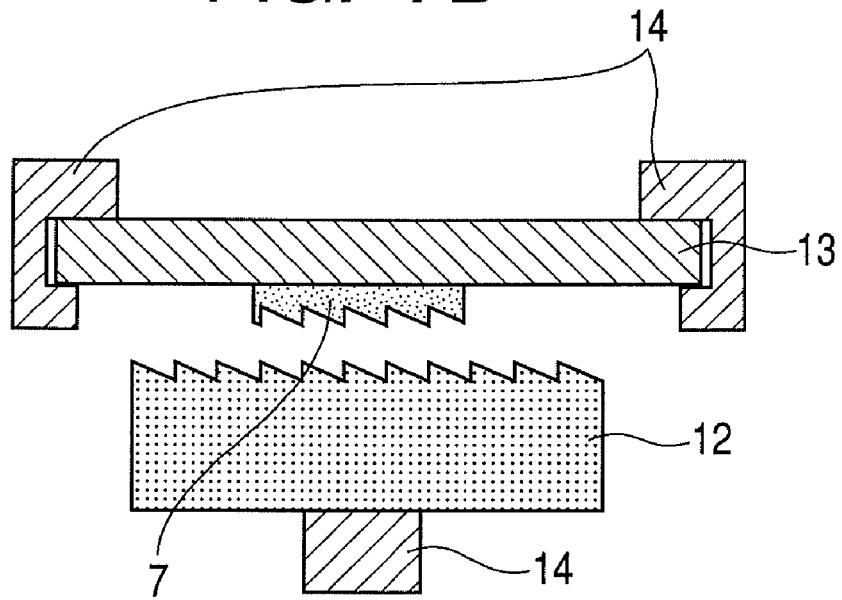
Figure 8A:
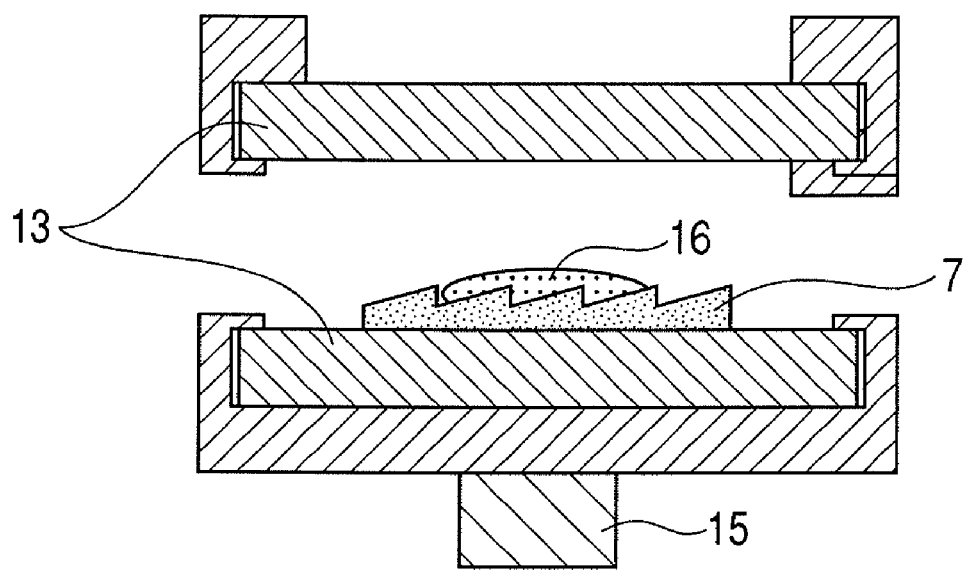
FIGS. 8A and 8B are schematic illustration showing a fabricating method of a sample for estimating diffraction efficiency.
Figure 8B:
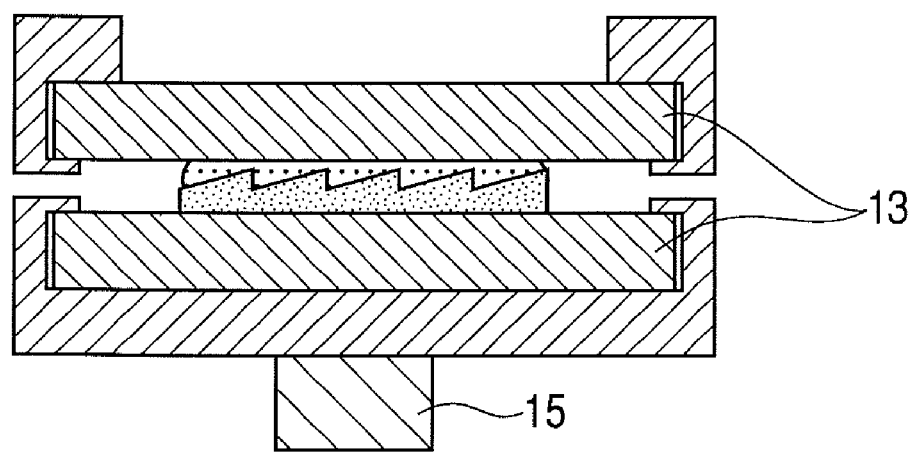

As shown in FIG. 6, the measured materials 7 (the high refractive index and low dispersion materials (A1 to A9) and the low refractive index and high dispersion materials (L1 to L9 and T1 to T6)) are let fall in drops on the estimation mold 12, and on those materials, a flat glass 13 is placed, thereby extending and spreading them so as to be 30 μm in total thickness of the resin and to be made as a sample. This sample was irradiated by a high pressure silver lamp (EXECURE 250, made by HOYA CANDEO OPTRONICS CO., LTD) under the conditions of 20 mW/cm² and 1000 seconds, thereby curing the sample (FIG. 7A). The cured sample, as shown in FIG. 7B, was released from the cured resin by a mold release jig 14 such that the flat glass 13 can be maintained in parallel with a horizontal face, and its edged shape was observed by a non-contact three dimensional face shape and roughness measuring instrument (New View 5000, made by Zygo Corporation).

The transferring shape of the high refractive index and low dispersion materials A1 to A9 and Z1 and Z2 were observed, and its result was shown in Table 1. As shown in Table 1, all the edges of the high refractive index and low dispersion materials A1 to A9 were transferred in good shape. In contrast to this, the high refractive index and low dispersion materials Z1 and Z2 were unable to obtain sufficient transferability. With respect to the low refractive index and high dispersion materials L1 to L9 and T1 to T6, good transferability was also obtained.

Measurement of Coefficient of Linear Expansion

Coefficient of linear expansion of each optical element was measured in the following manner. A part of the substrate of a sample for transmittance measurement was taken out, and was measured by a TMA (made by PerkinElmer, Inc.). The measurement result of the high refractive index and low dispersion materials A1 to A9 is shown in Table 1.

Multi-Layered Diffraction Optical Element 100

Next, the diffraction optical element using the high refractive index and low dispersion materials A1 to A9 and the optical element using the low refractive index and high dispersion materials L1 to L9 and T1 to T6 were laminated with no space provided between thereof, thereby preparing a multi-layered diffraction optical element, and its estimation was performed.

In Table 4, the configurations of the multi-layered diffraction optical elements of Examples 1 to 5 and Comparative Examples 1 to 4 are shown. Example 1 is the multi-layered diffraction optical element of the diffraction optical element using the high refractive index and low dispersion material A1 and the diffraction optical element using the low refractive index and high dispersion material L1. Likewise, Example 2 is the multi-layered diffraction optical element using the materials A2 and L2, Example 3 using A3 and L3, the fourth Example 4 using A4 and L4, and Example 5 using A6 and L6. Comparative Example 1 is the multi-layered diffraction optical element using the materials A5 and L5, Comparative Example 2 using A7 and L7, Comparative Example 3 A8 and L8, Comparative Example 4 L-BAL35 and L9. The shape (height and pitch width) of the diffraction grating in Examples 1 to 5 and Comparative Examples 1 to 4 is as shown in Table 4.

In Table 5, the configurations of the multi-layered diffraction optical element of Examples 6 to 11 are shown. Example 6 is the multi-layered diffraction optical element of the diffraction optical element using the high refractive index and low dispersion material A3 and the diffraction optical element using the low refractive index and high dispersion material T1. Likewise, Example 7 is the multi-layered diffraction optical element using the materials A4 and T2, Example 8 using A5 and T3, Example 9 using A6 and T4, Example 10 using A7 and T5, and Example 11 using A8 and T6. The shape (height and pitch width) of the diffraction grating in Examples 6 to 11 is as shown in Table 5.

Estimation of Diffraction Efficiency

The refraction efficiency of each multi-layered diffraction optical element was measured by preparing samples in the following manner.

First, similarly to the fabricating method of the diffraction optical element described by using FIGS. 5 to 7A and 7B, the diffraction optical element using the high refractive index and low dispersion material was prepared. However, an L-BAL 35 glass (made by OHARA INC.) in Comparative Example 4 was prepared to the similar shape by cutting and polishing.

Figure 9:
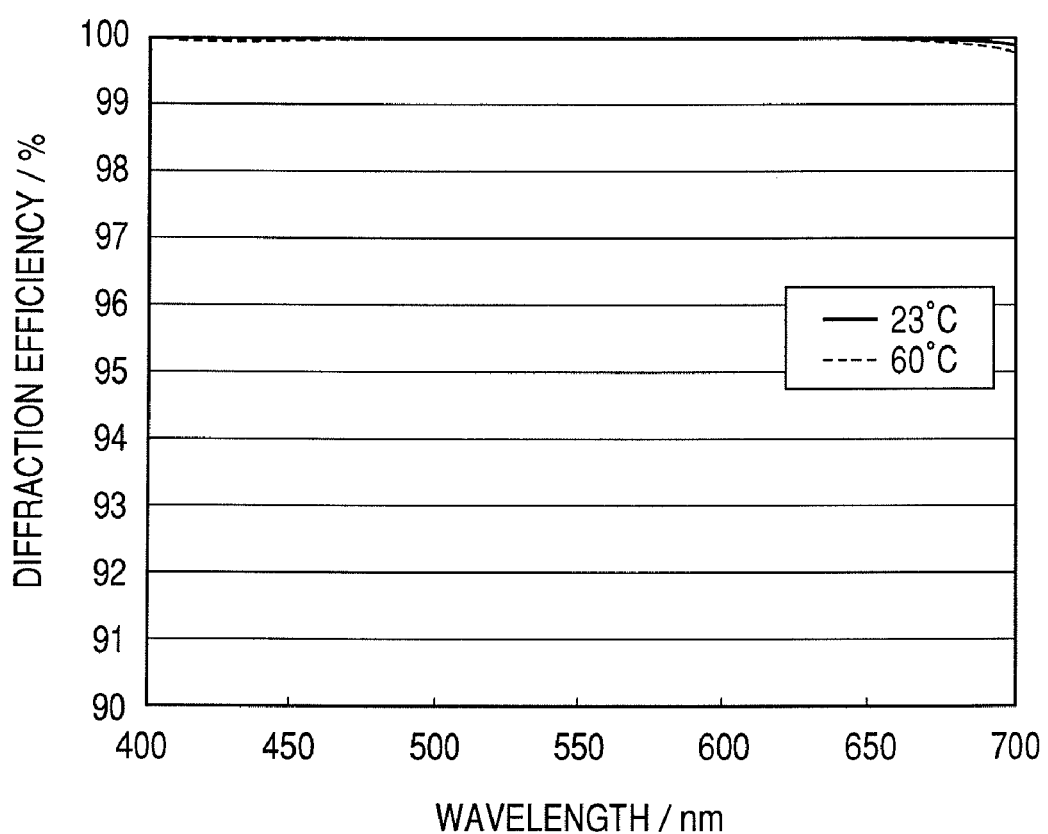
FIG. 9 is a graph showing a measurement result of the diffraction efficiency of Example 1.
Figure 10:
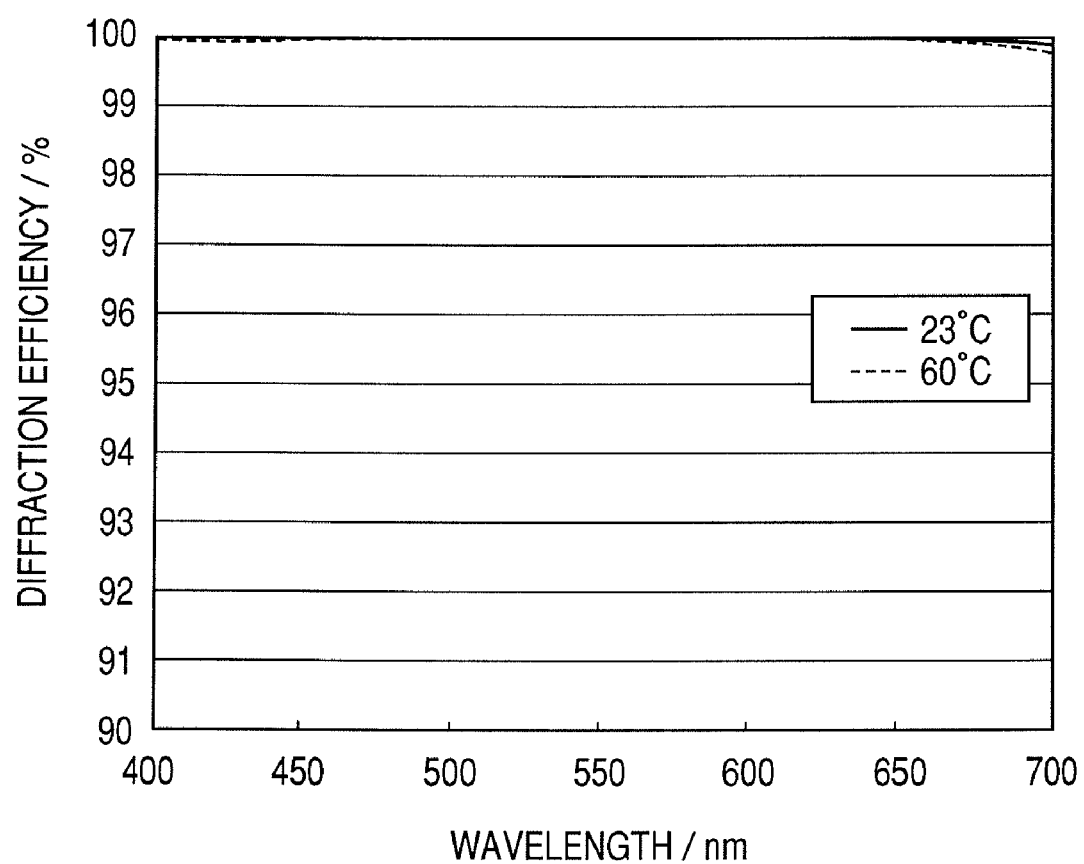
FIG. 10 is a graph showing a measurement result of the diffraction efficiency of Example 2.
Figure 11:
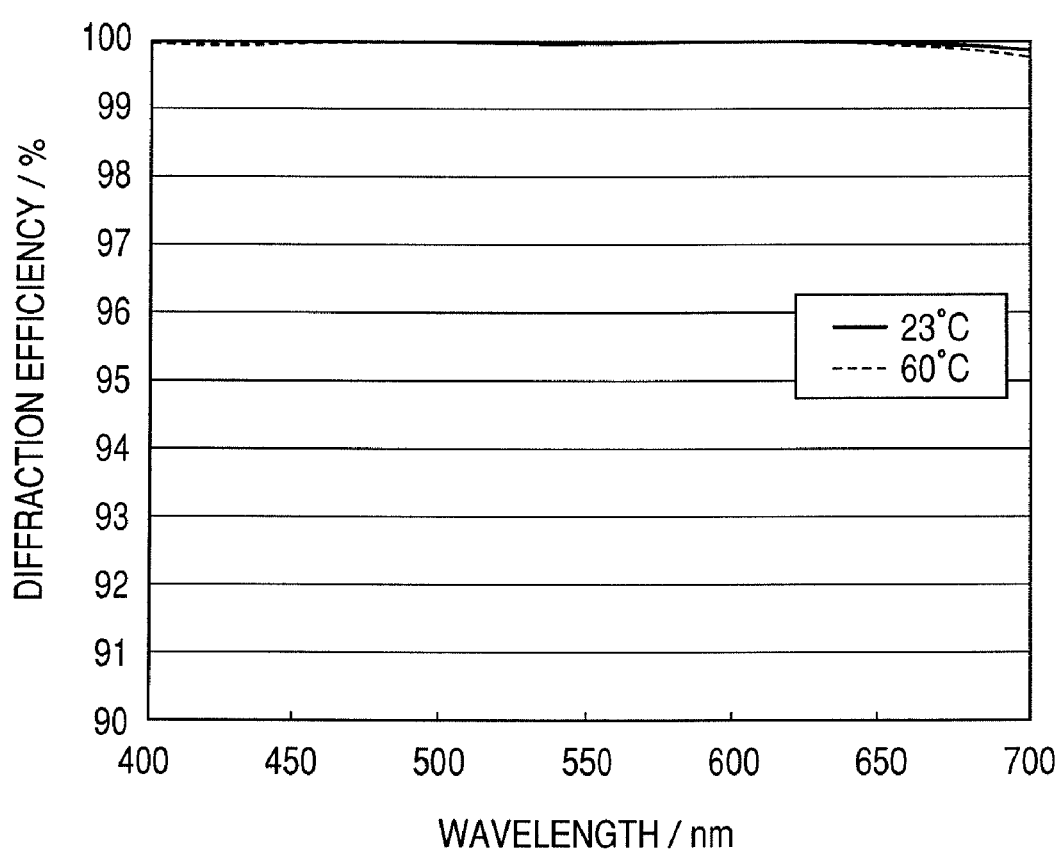
FIG. 11 is a graph showing a measurement result of the diffraction efficiency of Example 3.
Figure 12:
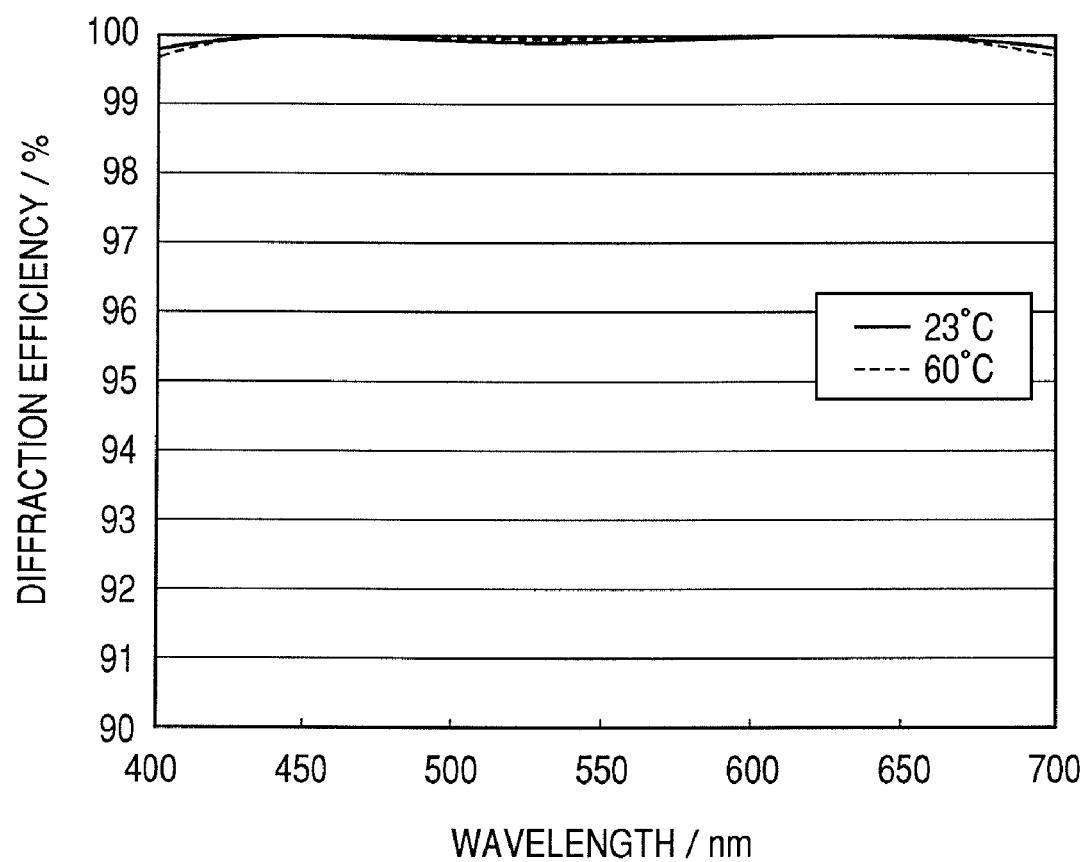
FIG. 12 is a graph showing a measurement result of the diffraction efficiency of Example 4.
Figure 13:
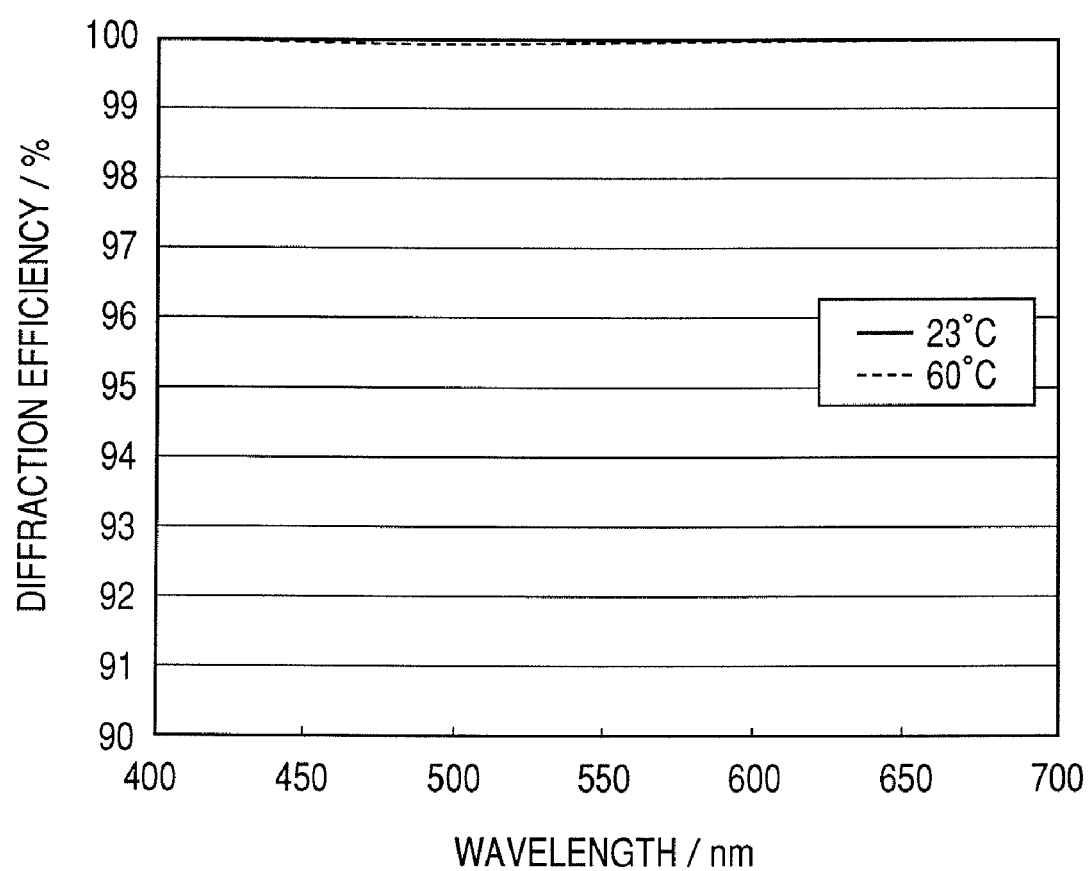
FIG. 13 is a graph showing a measurement result of the diffraction efficiency of Example 5.

Next, the high refractive index and low dispersion material formed on the flat glass 13 are set to a forming jig 15 together with the flat glass 13, and subsequently, a low refractive index and high dispersion material 16 was let fall in drops on the high refractive index and low dispersion material 7 (FIG. 9A). On this material 7, the flat glass 13 was placed, thereby extending and spreading the material 7 so that the thickness of the resin becomes 10 μm higher than the height of the grating (FIG. 9B) so as to be made as a sample. This sample was irradiated by a high pressure silver lamp (EXECURE 250, made by HOYA CANDEO OPTRONICS CO., LTD) under the conditions of 20 mW/cm$^2$ and 1000 seconds, thereby curing the sample. The cured sample was taken out, and the diffraction efficiency at 25° C. and 60° C. was measured.

The diffraction efficiency is the transmittance in the case where a member on the substrate prepared by the same resin as the diffraction optical element and having the same film thickness is irradiated with an amount of light of the design degree of the diffraction grating. The same film thickness as the diffraction optical element means an average film thickness of the diffraction optical element. The result of Examples 1 to 5 and Comparative Examples 1 to 4 is shown in Table 4. The result of Examples 6 to 11 is shown in Table 5.

Measurement of Flare Coefficient

The flare coefficient of each multi-layered diffraction optical element was measured in the following manner. The light inclined by 15 degrees was allowed to enter a multi-layered diffraction optical element 100 and the diffraction light of the design degree was let pass through by taking off the back of the integrating sphere of a spectrophotometer (U4000, made by Hitachi, Ltd.), and the flare light other than that light was measured. The result of Examples 1 to 5 and Comparative Examples 1 to 4 is shown in Table 4. The result of Examples 6 to 11 is shown in Table 5.

TABLE 1

| | INORGANIC FINE PARTICLE | | ORGANIC COMPONENT | | OPTICAL CHARACTERISTIC | |
|---|---|---|---|---|---|---|
| | TYPE | CONTENT (v %) | TYPE | CONTENT (v %) | REFRACTION INDEX | ABBE NUMBER vd |
| HIGH REFRACTIVE INDEX AND LOW DISPERSION MATERIAL Z1 | ZIRCONIA | 30 | ULTRAVIOLET-CURING ACRYL RESIN B | 70.0 | | |
| HIGH REFRACTIVE INDEX AND LOW DISPERSION MATERIAL A1 | ZIRCONIA | 23.0 | ULTRAVIOLET-CURING ACRYL RESIN B | 77.0 | 1.621 | 44.1 |
| HIGH REFRACTIVE INDEX AND LOW DISPERSION MATERIAL A2 | ZIRCONIA | 20.0 | ULTRAVIOLET-CURING ACRYL RESIN B | 80.0 | 1.610 | 44.6 |
| HIGH REFRACTIVE INDEX AND LOW DISPERSION MATERIAL A3 | ZIRCONIA | 18.0 | ULTRAVIOLET-CURING ACRYL RESIN B | 82.0 | 1.602 | 45.0 |
| HIGH REFRACTIVE INDEX AND LOW DISPERSION MATERIAL A4 | ZIRCONIA | 10.0 | ULTRAVIOLET-CURING ACRYL RESIN B | 90.0 | 1.571 | 46.7 |
| HIGH REFRACTIVE INDEX AND LOW DISPERSION MATERIAL A5 | ZIRCONIA | 6.0 | ULTRAVIOLET-CURING ACRYL RESIN B | 94.0 | 1.556 | 47.2 |
| HIGH REFRACTIVE INDEX AND LOW DISPERSION MATERIAL Z2 | ALUMINA | 30.0 | ULTRAVIOLET-CURING ACRYL RESIN C | 70.0 | | |
| HIGH REFRACTIVE INDEX AND LOW DISPERSION MATERIAL A6 | ALUMINA | 26.0 | ULTRAVIOLET-CURING ACRYL RESIN C | 74.0 | 1.576 | 56.4 |
| HIGH REFRACTIVE INDEX AND LOW DISPERSION MATERIAL A7 | ALUMINA | 15.0 | ULTRAVIOLET-CURING ACRYL RESIN C | 85.0 | 1.558 | 54.7 |
| HIGH REFRACTIVE INDEX AND LOW DISPERSION MATERIAL A8 | ALUMINA | 7.0 | ULTRAVIOLET-CURING ACRYL RESIN C | 93.0 | 1.543 | 53.3 |

| | OPTICAL CHARACTERISTIC AVERAGE TRANSMITTANCE | SHAPE TRANSFERABILITY | COEFFICIENT OF LINEAR EXPANSION/ ° C. | COMMENT |
|---|---|---|---|---|
| HIGH REFRACTIVE INDEX AND LOW DISPERSION MATERIAL Z1 | | BAD | | HIGHLY THICKENED AND REMOVAL OF SOLUTION INCOMPLETE |

TABLE 1-continued

| | | | |
|---|---|---|---|
| HIGH REFRACTIVE INDEX AND LOW DISPERSION MATERIAL A1 | 99.3 | GOOD | 8.9E−05 |
| HIGH REFRACTIVE INDEX AND LOW DISPERSION MATERIAL A2 | 99.2 | GOOD | 8.6E−05 |
| HIGH REFRACTIVE INDEX AND LOW DISPERSION MATERIAL A3 | 99.4 | GOOD | 9.1E−05 |
| HIGH REFRACTIVE INDEX AND LOW DISPERSION MATERIAL A4 | 99.1 | GOOD | 8.7E−05 |
| HIGH REFRACTIVE INDEX AND LOW DISPERSION MATERIAL A5 | 99.6 | GOOD | 9.0E−05 |
| HIGH REFRACTIVE INDEX AND LOW DISPERSION MATERIAL Z2 | | BAD | HIGHLY THICKENED AND REMOVAL OF SOLUTION INCOMPLETE |
| HIGH REFRACTIVE INDEX AND LOW DISPERSION MATERIAL A6 | 96.2 | GOOD | 9.20E−05 |
| HIGH REFRACTIVE INDEX AND LOW DISPERSION MATERIAL A7 | 97.8 | GOOD | 8.90E−05 |
| HIGH REFRACTIVE INDEX AND LOW DISPERSION MATERIAL A8 | 98.9 | GOOD | 1.00E−04 |

TABLE 2

| | INORGANIC FINE PARTICLE | | ORGANIC COMPONENT | | OPTICAL CHARACTERISTIC | |
|---|---|---|---|---|---|---|
| | YYPE | CONTENT (v %) | TYPE | CONTENT (v %) | REFRACTION INDEX nd | ABBE NUMBER vd |
| LOW REFRACTIVE INDEX AND HIGH DISPERSION MATERIAL L1 | ITO | 16.0 | ULTRAVIOLET-CURING ACRYL RESIN C | 84.0 | 1.570 | 19.5 |
| LOW REFRACTIVE INDEX AND HIGH DISPERSION MATERIAL L2 | ITO | 14.1 | ULTRAVIOLET-CURING ACRYL RESIN C | 85.9 | 1.565 | 20.8 |
| LOW REFRACTIVE INDEX AND HIGH DISPERSION MATERIAL L3 | ITO | 12.9 | ULTRAVIOLET-CURING ACRYL RESIN C | 87.1 | 1.561 | 21.9 |
| LOW REFRACTIVE INDEX AND HIGH DISPERSION MATERIAL L4 | ITO | 7.9 | ULTRAVIOLET-CURING ACRYL RESIN C | 92.1 | 1.546 | 27.6 |
| LOW REFRACTIVE INDEX AND HIGH DISPERSION MATERIAL L5 | ITO | 5.4 | ULTRAVIOLET-CURING ACRYL RESIN C | 94.6 | 1.539 | 32.1 |
| LOW REFRACTIVE INDEX AND HIGH DISPERSION MATERIAL L6 | ITO | 7.6 | ULTRAVIOLET-CURING ACRYL RESIN C | 92.4 | 1.546 | 28.0 |
| LOW REFRACTIVE INDEX AND HIGH DISPERSION MATERIAL L7 | ITO | 4.8 | ULTRAVIOLET-CURING ACRYL RESIN C | 95.2 | 1.537 | 33.3 |
| LOW REFRACTIVE INDEX AND HIGH DISPERSION MATERIAL L8 | ITO | 2.8 | ULTRAVIOLET-CURING ACRYL RESIN C | 97.2 | 1.531 | 38.9 |
| LOW REFRACTIVE INDEX AND HIGH DISPERSION MATERIAL L9 | ITO | 8.7 | ULTRAVIOLET-CURING ACRYL RESIN C | 91.3 | 1.549 | 26.5 |

TABLE 3

| | INORGANIC FINE PARTICLE | | ORGANIC COMPONENT | | OPTICAL CHARACTERISTIC | |
|---|---|---|---|---|---|---|
| | TYPE | CONTENT (v %) | TYPE | CONTENT (v %) | REFRACTION INDEX nd | ABBE NUMBER vd |
| LOW REFRACTIVE INDEX AND HIGH DISPERSION MATERIAL T1 | ITO | 21.6 | ULTRAVIOLET-CURING ACRYL RESIN D | 78.4 | 1.527 | 14.1 |
| LOW REFRACTIVE INDEX AND HIGH DISPERSION MATERIAL T2 | ITO | 17.3 | ULTRAVIOLET-CURING ACRYL RESIN D | 82.7 | 1.508 | 16.1 |
| LOW REFRACTIVE INDEX AND HIGH | ITO | 15.2 | ULTRAVIOLET- | 84.8 | 1.499 | 17.3 |

TABLE 3-continued

| | INORGANIC FINE PARTICLE | | ORGANIC COMPONENT | | OPTICAL CHARACTERISTIC | |
|---|---|---|---|---|---|---|
| | TYPE | CONTENT (v %) | TYPE | CONTENT (v %) | REFRACTION INDEX nd | ABBE NUMBER vd |
| DISPERSION MATERIAL T3 | | | CURING ACRYL RESIN D | | | |
| LOW REFRACTIVE INDEX AND HIGH DISPERSION MATERIAL T4 | ITO | 16.8 | ULTRAVIOLET-CURING ACRYL RESIN D | 83.2 | 1.506 | 16.4 |
| LOW REFRACTIVE INDEX AND HIGH DISPERSION MATERIAL T5 | ITO | 14.6 | ULTRAVIOLET-CURING ACRYL RESIN D | 85.4 | 1.496 | 17.8 |
| LOW REFRACTIVE INDEX AND HIGH DISPERSION MATERIAL T6 | ITO | 13.0 | ULTRAVIOLET-CURING ACRYL RESIN D | 87.0 | 1.489 | 19.0 |

TABLE 4

| | HIGH REFRACTIVE INDEX AND LOW DISPERSION MATERIAL | | | LOW REFRACTIVE INDEX AND HIGH DISPERSION MATERIAL | | |
|---|---|---|---|---|---|---|
| | | OPTICAL CHARACTERISTIC | | | OPTICAL CHARACTERISTIC | |
| | | REFRACTION INDEX nd | ABBE NUMBER vd | | REFRACTION INDEX nd | ABBE NUMBER vd |
| EXAMPLE 1 | HIGH REFRACTIVE INDEX AND LOW DISPERSION MATERIAL A1 | 1.621 | 44.1 | LOW REFRACTIVE INDEX AND HIGH DISPERSION MATERIAL L1 | 1.570 | 19.5 |
| EXAMPLE 2 | HIGH REFRACTIVE INDEX AND LOW DISPERSION MATERIAL A2 | 1.610 | 44.6 | LOW REFRACTIVE INDEX AND HIGH DISPERSION MATERIAL L2 | 1.565 | 20.8 |
| EXAMPLE 3 | HIGH REFRACTIVE INDEX AND LOW DISPERSION MATERIAL A3 | 1.602 | 45.0 | LOW REFRACTIVE INDEX AND HIGH DISPERSION MATERIAL L3 | 1.561 | 21.9 |
| EXAMPLE 4 | HIGH REFRACTIVE INDEX AND LOW DISPERSION MATERIAL A4 | 1.571 | 46.7 | LOW REFRACTIVE INDEX AND HIGH DISPERSION MATERIAL L4 | 1.546 | 27.6 |
| EXAMPLE 5 | HIGH REFRACTIVE INDEX AND LOW DISPERSION MATERIAL A6 | 1.576 | 56.4 | LOW REFRACTIVE INDEX AND HIGH DISPERSION MATERIAL L6 | 1.546 | 28.0 |
| COMPARATIVE EXAMPLE 1 | HIGH REFRACTIVE INDEX AND LOW DISPERSION MATERIAL A5 | 1.556 | 47.2 | LOW REFRACTIVE INDEX AND HIGH DISPERSION MATERIAL L5 | 1.539 | 32.1 |
| COMPARATIVE EXAMPLE 2 | HIGH REFRACTIVE INDEX AND LOW DISPERSION MATERIAL A7 | 1.558 | 54.7 | LOW REFRACTIVE INDEX AND HIGH DISPERSION MATERIAL L7 | 1.537 | 33.3 |
| COMPARATIVE EXAMPLE 3 | HIGH REFRACTIVE INDEX AND LOW DISPERSION MATERIAL A8 | 1.543 | 53.3 | LOW REFRACTIVE INDEX AND HIGH DISPERSION MATERIAL L8 | 1.531 | 38.9 |
| COMPARATIVE EXAMPLE 4 | L-BAL35 (GLASS: MADE BY OHARA) | 1.589 | 60.8 | LOW REFRACTIVE INDEX AND HIGH DISPERSION MATERIAL L9 | 1.549 | 26.5 |

| | REFRACTION INDEX DIFFERENCE $\Delta$nd | DIFFRACTION LATTICE SHAPE | | MINIMUM VALUE OF DIFFRACTION EFFICIENCY | | FLARE COEFFICIENT % |
|---|---|---|---|---|---|---|
| | | THICKNESS OF DIFFRACTIVE GRATING μm | PITCH WIDTH μm | ROOM TEMPERATURE (23° C.) % | 60° C. % | |
| EXAMPLE 1 | 0.051 | 11.5 | 80 | 99.9 | 99.8 | 0.5 |
| EXAMPLE 2 | 0.045 | 13.0 | 80 | 99.9 | 99.8 | 0.6 |
| EXAMPLE 3 | 0.041 | 14.3 | 80 | 99.9 | 99.8 | 0.7 |
| EXAMPLE 4 | 0.024 | 23.9 | 80 | 99.8 | 99.7 | 1.7 |
| EXAMPLE 5 | 0.031 | 18.1 | 80 | 99.9 | 99.9 | 1.1 |
| COMPARATIVE EXAMPLE 1 | 0.017 | 36.1 | 80 | 99.3 | 99.1 | 3.1 |
| COMPARATIVE EXAMPLE 2 | 0.021 | 28.3 | 80 | 99.9 | 99.9 | 2.2 |

TABLE 4-continued

|  | | | | | | |
|---|---|---|---|---|---|---|
| COMPARATIVE EXAMPLE 3 | 0.012 | 48.5 | 80 | 99.9 | 99.9 | 3.8 |
| COMPARATIVE EXAMPLE 4 | 0.040 | 14.6 | 80 | 99.8 | 75 | 0.8 |

TABLE 5

| | | HIGH REFRACTIVE INDEX AND LOW DISPERSION MATERIAL | | | LOW REFRACTIVE INDEX AND HIGH DISPERSION MATERIAL | |
|---|---|---|---|---|---|---|
| | | | OPTICAL CHARACTERISTIC | | | OPTICAL CHARACTERISTIC |
| | | | REFRACTION INDEX nd | ABBE NUMBER νd | | REFRACTION INDEX nd | ABBE NUMBER νd |
| EXAMPLE 6 | HIGH REFRACTIVE INDEX AND LOW DISPERSION MATERIAL A1 | 1.602 | 45.0 | LOW REFRACTIVE INDEX AND HIGH DISPERSION MATERIAL L1 | 1.527 | 14.1 |
| EXAMPLE 7 | HIGH REFRACTIVE INDEX AND LOW DISPERSION MATERIAL A2 | 1.571 | 46.7 | LOW REFRACTIVE INDEX AND HIGH DISPERSION MATERIAL L2 | 1.508 | 16.1 |
| EXAMPLE 8 | HIGH REFRACTIVE INDEX AND LOW DISPERSION MATERIAL A3 | 1.556 | 47.2 | LOW REFRACTIVE INDEX AND HIGH DISPERSION MATERIAL L3 | 1.499 | 17.3 |
| EXAMPLE 9 | HIGH REFRACTIVE INDEX AND LOW DISPERSION MATERIAL A4 | 1.576 | 56.4 | LOW REFRACTIVE INDEX AND HIGH DISPERSION MATERIAL L4 | 1.506 | 16.4 |
| EXAMPLE 10 | HIGH REFRACTIVE INDEX AND LOW DISPERSION MATERIAL A6 | 1.558 | 54.7 | LOW REFRACTIVE INDEX AND HIGH DISPERSION MATERIAL L6 | 1.496 | 17.8 |
| EXAMPLE 11 | HIGH REFRACTIVE INDEX AND LOW DISPERSION MATERIAL A5 | 1.543 | 53.3 | LOW REFRACTIVE INDEX AND HIGH DISPERSION MATERIAL L5 | 1.489 | 19.0 |

| | | DIFFRACTIVE GRATING SHAPE | | MINIMUM VALUE OF DIFFRACTION EFFICIENCY | | |
|---|---|---|---|---|---|---|
| | REFRACTION INDEX DIFFERENCE Δnd | THICKNESS OF DIFFRACTIVE GRATING μm | PITCH WIDTH μm | ROOM TEMPERATURE (23° C.) % | 60° C. % | FLARE COEFFICIENT % |
| EXAMPLE 6 | 0.075 | 7.3 | 80 | 99.9 | 99.8 | 0.2 |
| EXAMPLE 7 | 0.062 | 9.0 | 80 | 99.9 | 99.7 | 0.3 |
| EXAMPLE 8 | 0.057 | 10.2 | 80 | 99.9 | 99.7 | 0.4 |
| EXAMPLE 9 | 0.070 | 8.1 | 80 | 99.9 | 99.5 | 0.2 |
| EXAMPLE 10 | 0.062 | 9.5 | 80 | 99.9 | 99.5 | 0.3 |
| EXAMPLE 11 | 0.054 | 10.8 | 80 | 99.9 | 99.3 | 0.4 |

Measurement and Estimation Result

First to Fifth Examples 1 to 5

As evident from Table 4, the refraction index $n_d$ of the high refractive index and low dispersion material in Examples 1 to 5 was 1.57 or more and 1.63 or less, and the Abbe number $v_d$ was 44 or more and 57 or less. The refraction index $n_d$ of the low refractive index and high dispersion material was 1.54 or more and 1.57 or less, and the Abbe number $v_d$ was 19 or more and 28 or less. The refraction index difference between the high refractive index and low dispersion material and the low refractive index and high dispersion material was 0.024 or more and 0.051 or less.

FIGS. 9 to 13 are graphs showing the diffraction efficiency in each wavelength of the multi-layered diffraction optical element in Examples 1 to 5. As evident from Table 4 and FIGS. 9 to 13, the diffraction efficiency of Examples 1 to 5 is 99% or more for either case of 23° C. and 60° C., and is extremely good. As shown in Table 4, the flare coefficient of Examples 1 to 5 is 1.1% or less, and is extremely good.

Comparative Examples 1 to 3

As evident from Table 4, the refraction index $n_d$ of the high refractive index and low dispersion material in Comparative Examples 1 to 3 was 1.54 or more and 1.56 or less, and the Abbe number $v_d$ was 47 or more and 55 or less. The refraction index $n_d$ of the low refractive index and high dispersion material was 1.53 or more and 1.54 or less, and the Abbe number $v_d$ was 32 or more and 39 or less. The refraction index difference between the high refractive index and low dispersion material and the low refractive index and high dispersion material was 0.011 or more and 0.023 or less for any case.

Figure 14:
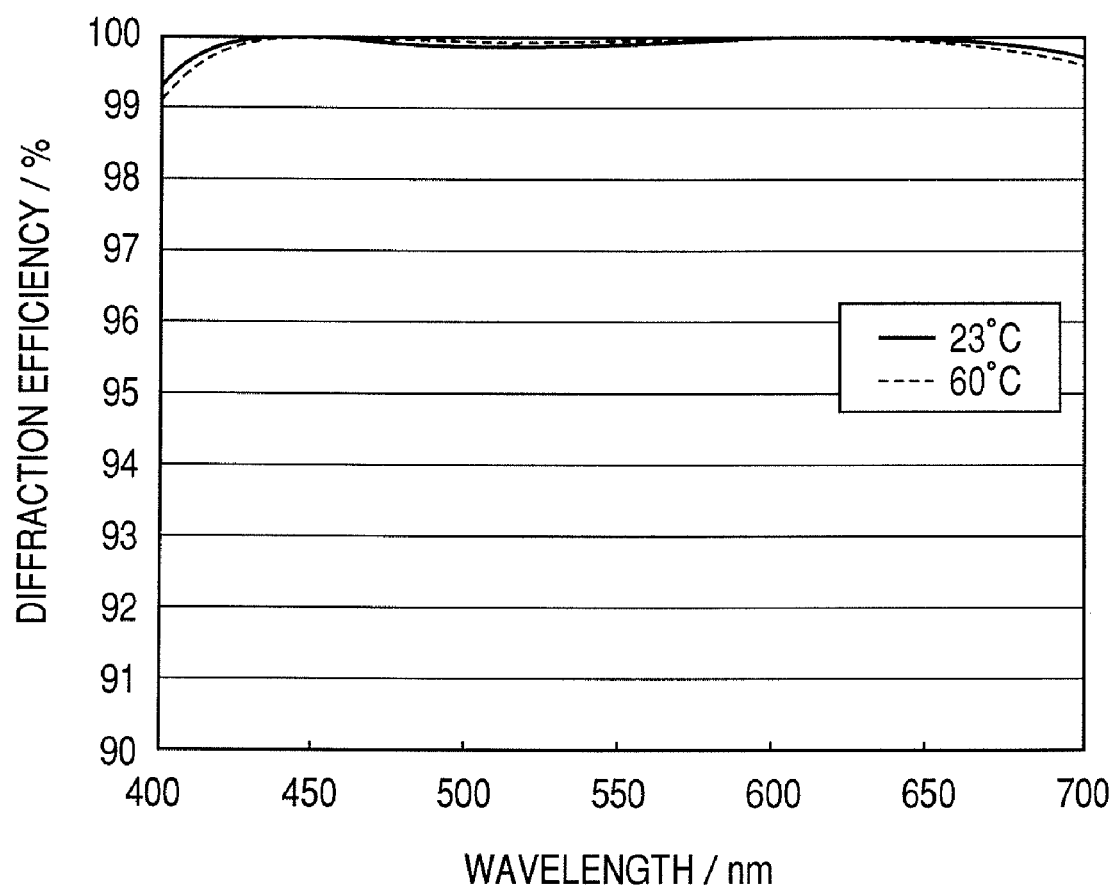
FIG. 14 is a graph showing a measurement result of the diffraction efficiency of Comparative Example 1.
Figure 15:
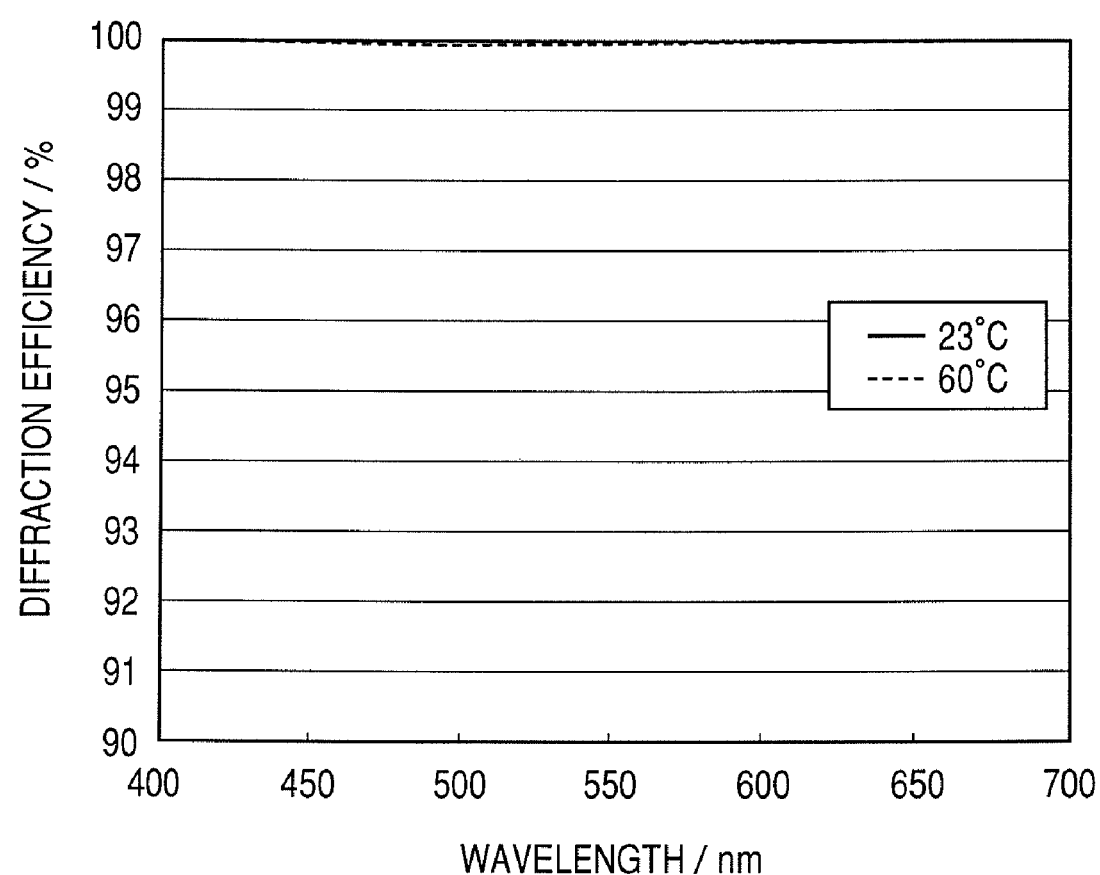
FIG. 15 is a graph showing a measurement result of the diffraction efficiency of Comparative Example 2.
Figure 16:
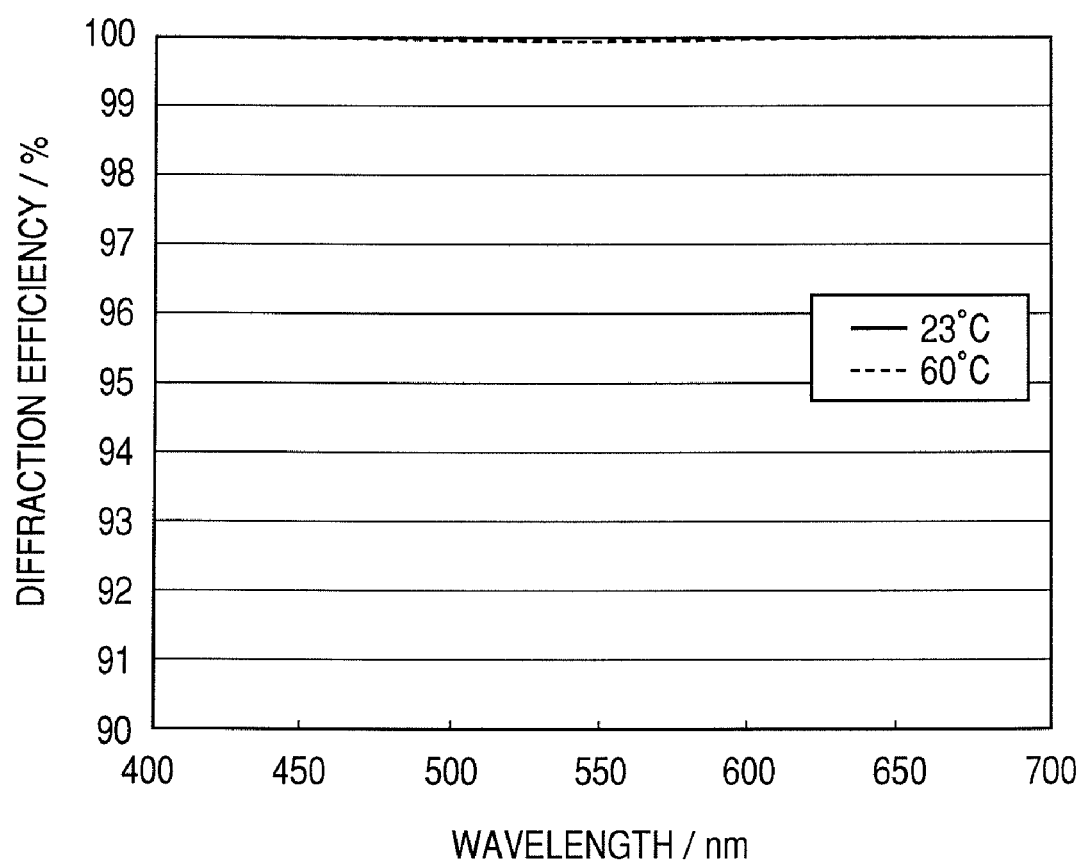
FIG. 16 is a graph showing a measurement result of the diffraction efficiency of Comparative Example 3.

FIGS. 14 to 16 are graphs showing the diffraction efficiency in each wavelength of the multi-layered diffraction optical element in Comparative Examples 1 to 3. The diffraction efficiency of Comparative Examples 1 to 3 is 99% or more for either case of 23° C. and 60° C., and is extremely good. However, as shown in Table 4, the flare coefficient of Comparative Examples 1 to 3 is 2.2% or more, and it is difficult to say that it is good.

Comparative Example 4

As evident from Table 4, the refraction index $n_d$ of the L-BAL35 which is the high refractive index and low dispersion material in Comparative Example 4 was 1.589, and the Abbe number $v_d$ was 60.8. The refraction index nd of the low refractive index and high dispersion material was 1.549, and the Abbe number $v_d$ was 26.5. The refraction index difference between the high refractive index and low dispersion material and the low refractive index and high dispersion material was 0.040.

Figure 17:
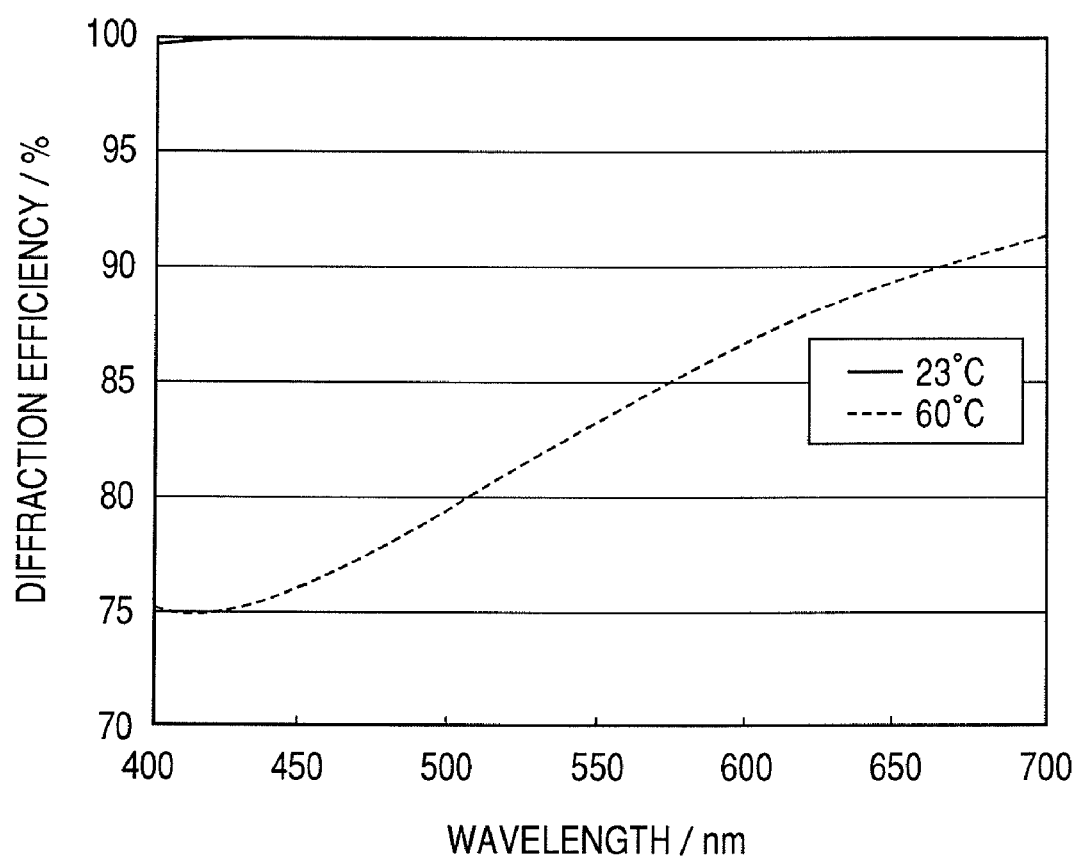
FIG. 17 is a graph showing a measurement result of the diffraction efficiency of Comparative Example 4.
Figure 18:
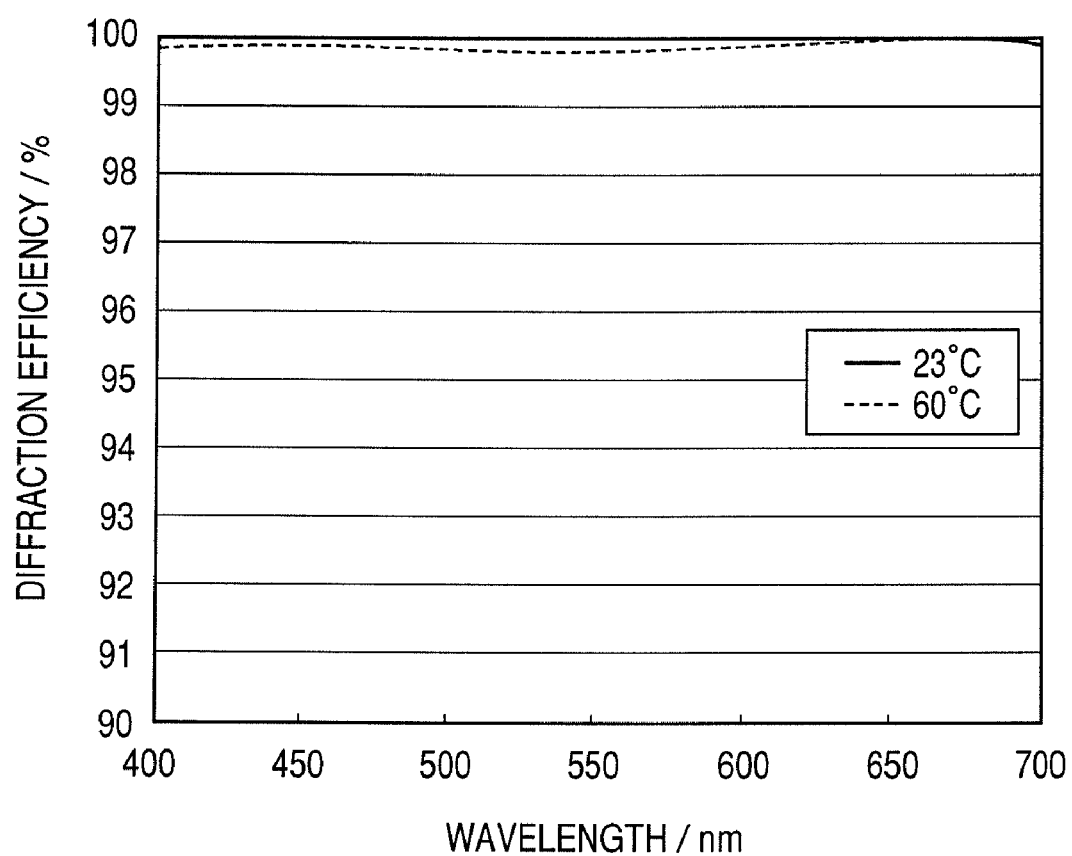
FIG. 18 is a graph showing a measurement result of the diffraction efficiency of Example 6.
Figure 19:
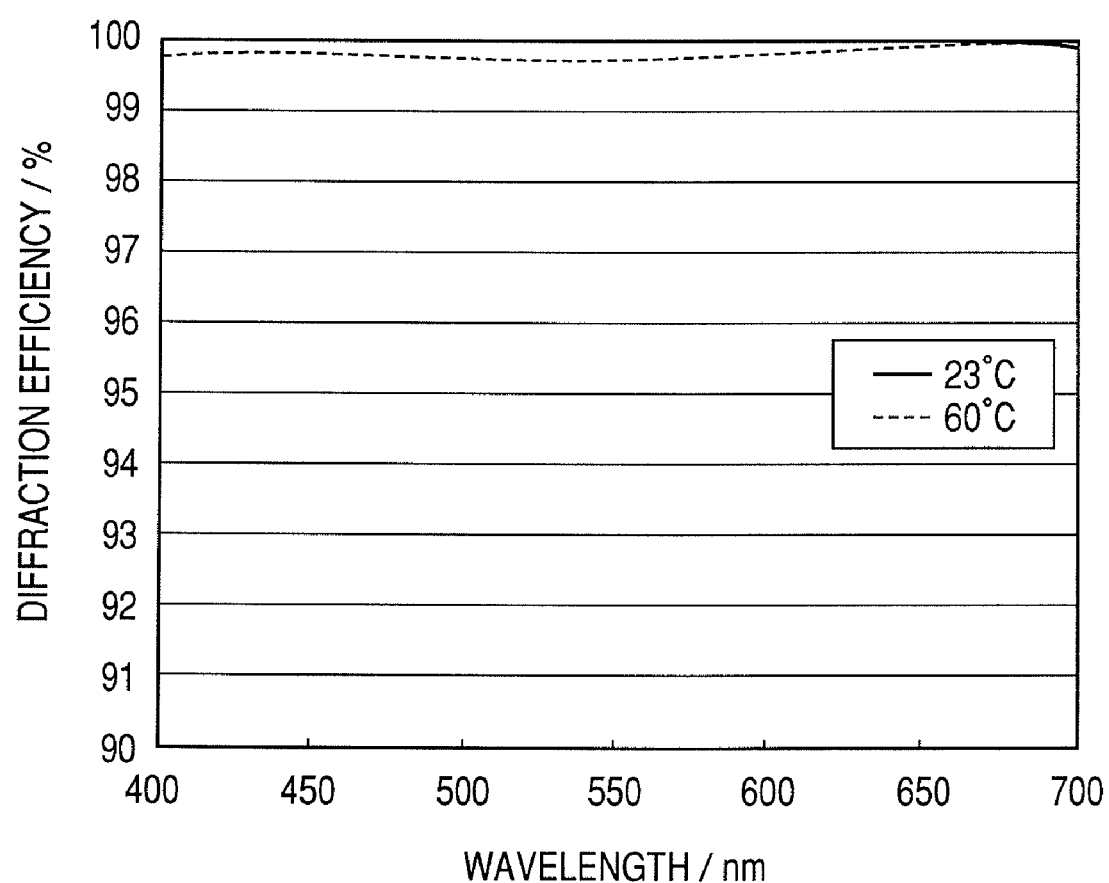
FIG. 19 is a graph showing a measurement result of the diffraction efficiency of Example 7.
Figure 20:
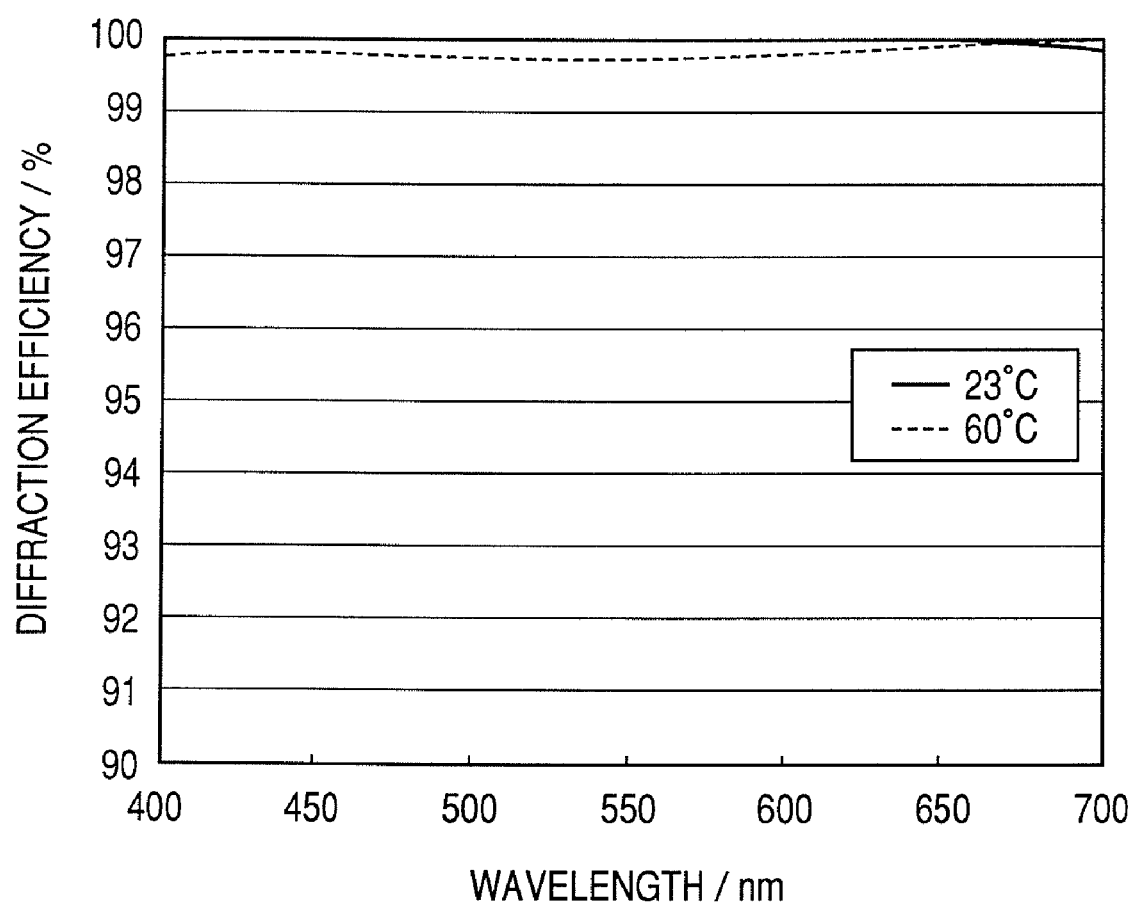
FIG. 20 is a graph showing a measurement result of the diffraction efficiency of Example 8.
Figure 21:
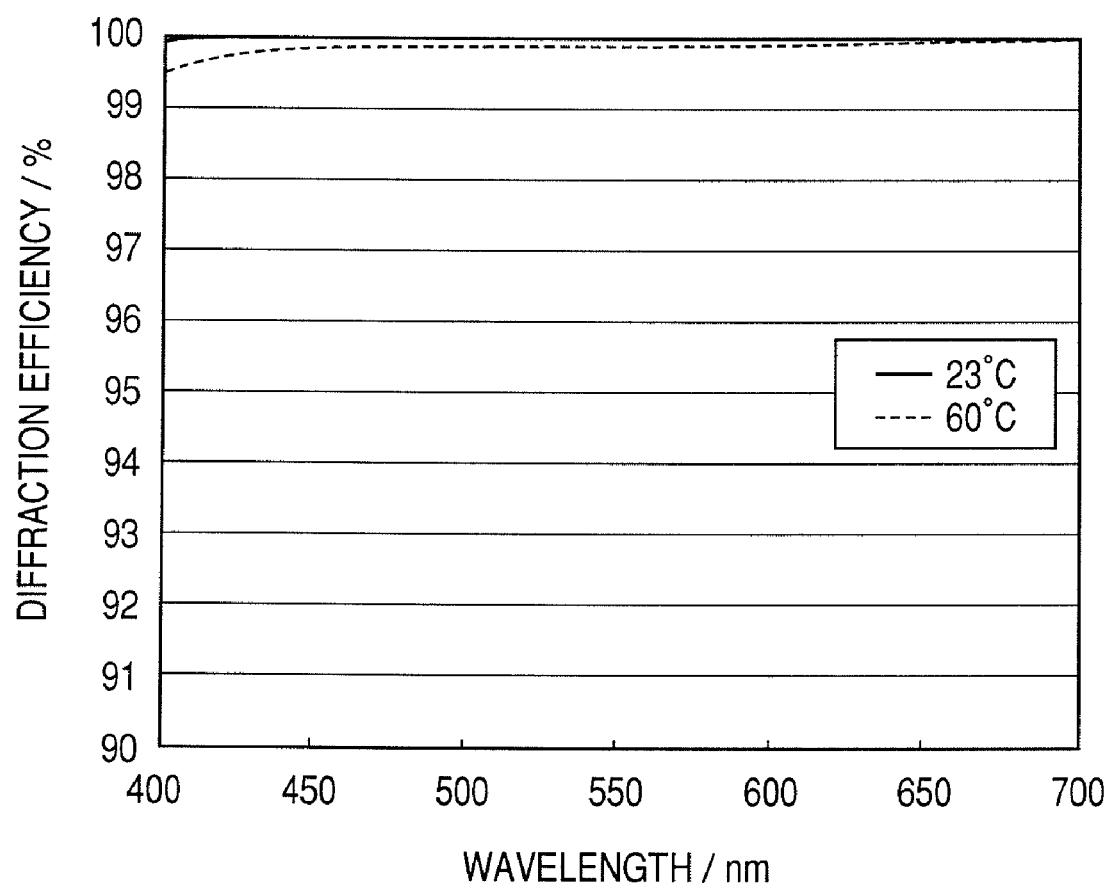
FIG. 21 is a graph showing a measurement result of the diffraction efficiency of Example 9.
Figure 22:
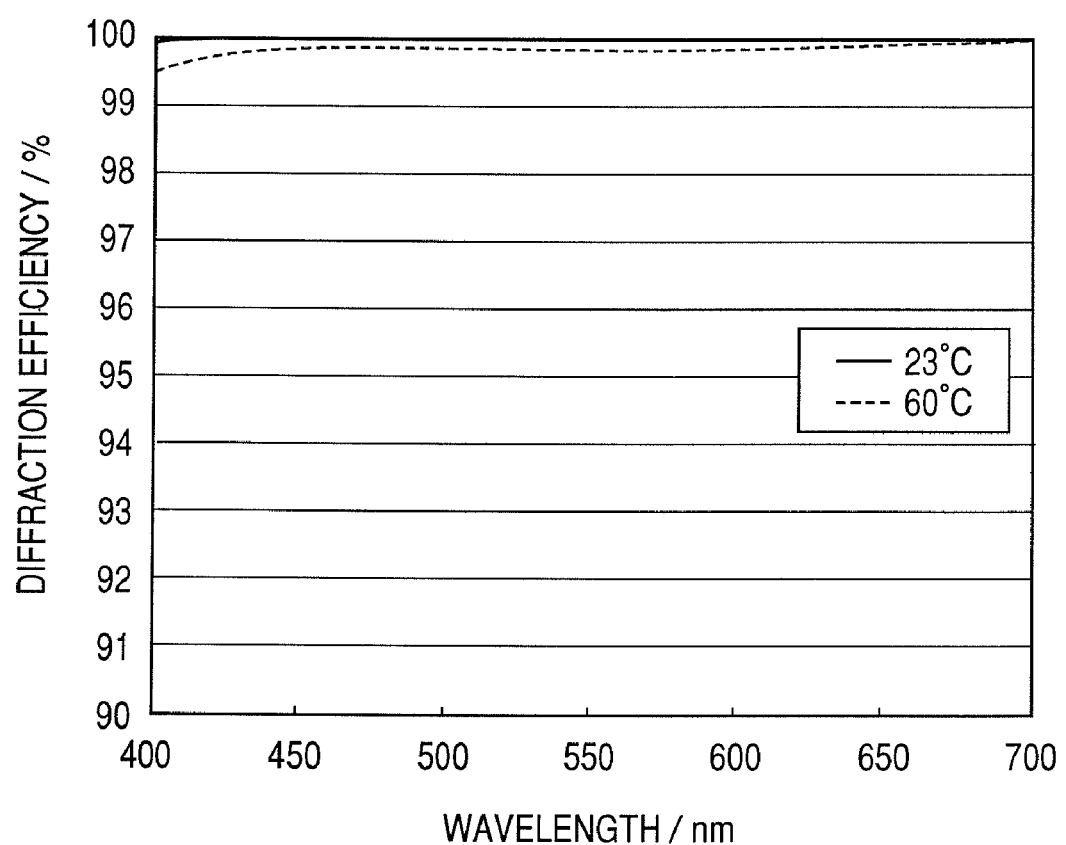
FIG. 22 is a graph showing a measurement result of the diffraction efficiency of Example 10.
Figure 23:
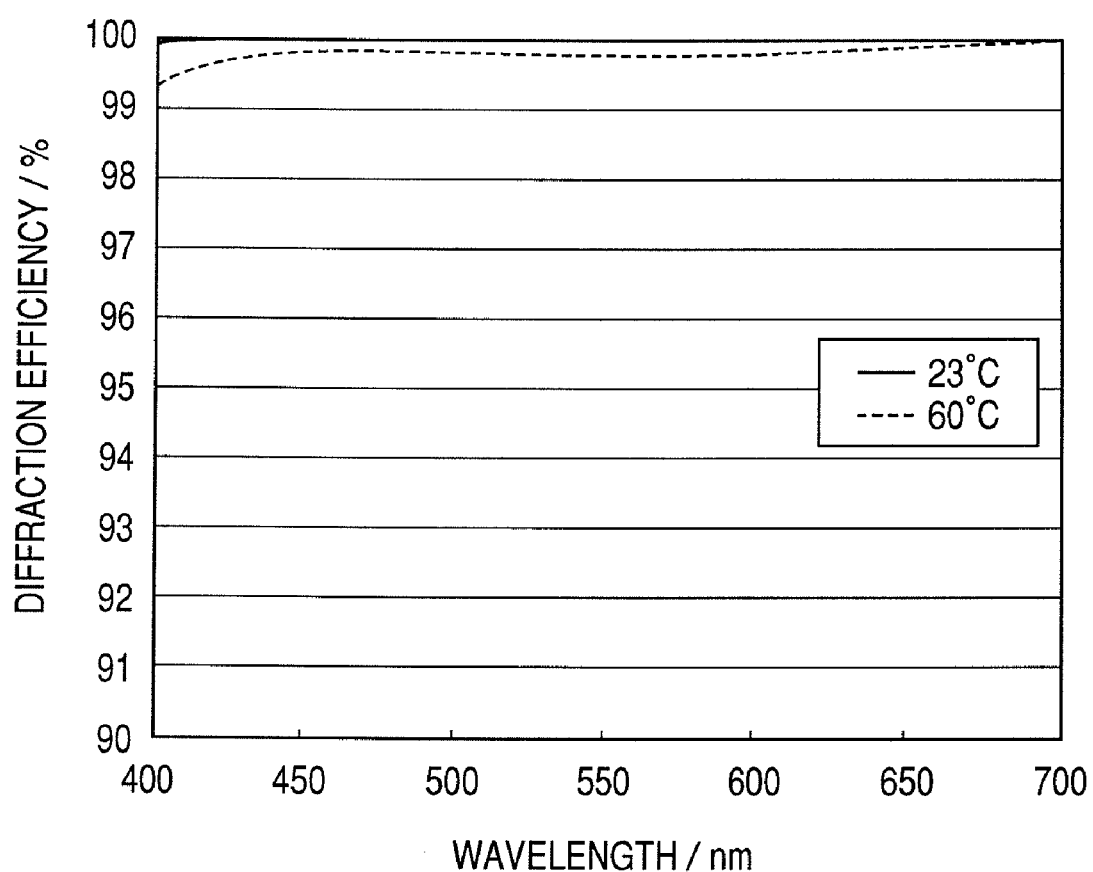
FIG. 23 is a graph showing a measurement result of the diffraction efficiency of Example 11.

As shown in Table 1, the coefficient of linear expansion of the L-BAL35 which is the high refractive index and low dispersion material in Comparative Example 4 is $7.0 \times 10^{-6}/°$C., and is extremely small. Hence, the temperature dependency of the refraction index differs vastly from the low refraction index and high dispersion L9. FIG. 17 is a graph showing diffraction efficiency in each wavelength of the multi-layered diffraction optical element in Comparative Example 4. Although the diffraction efficiency of Comparative Example 4 is 99% or more at 26° C., but at 60° C., the diffraction efficiency is 75%, and is reduced to a large extent.

Sixth to Eleventh Examples 6 to 11

As evident from Table 5, the refraction index $n_d$ of the high refractive index and low dispersion material in Examples 6 to 11 was 1.54 or more and 1.61 or less, and the Abbe number $v_d$ was 44 or more and 57 or less. The refraction index $n_d$ of the low refractive index and high dispersion material was 1.48 or more and 1.53 or less, and the Abbe number $v_d$ was 14 or more and 20 or less. The refraction index difference between the high refractive index and low dispersion material and the low refractive index and high dispersion material was 0.053 or more and 0.075 or less for any case.

FIGS. 18 to 23 are graphs showing the diffraction efficiency in each wavelength of the multi-layered diffraction optical element in Examples 6 to 11. The diffraction efficiency of Examples 1 to 5 is 99% or more for either case of 23° C. and 60° C., and is extremely good. As shown in Table 5, the flare coefficient of Examples 1 to 5 is 0.4% or less, and is extremely good.

From such results, in the case of the multi-layered diffraction optical element in which the high refractive index and low dispersion material dispersed with fine particles and the low refractive index and high dispersion material dispersed with fine particles are laminated with no space provided between thereof, the refraction index of d line of the high refractive index and low dispersion material is taken as 1.54 or more and 1.63 or less, and the Abbe number is taken as 44 or more and 57 or less, the refraction index of d line of the low refractive index and high dispersion material is taken as 1.48 or more and 1.57 or less, and the Abbe number is taken as 14 or more and 28 or less, and the difference of the refraction index of d line between the high refractive index and low dispersion material and the low refractive index and high dispersion material is taken as 0.024 or more and 0.075 or less, so that the multi-layered diffraction optical element can be realized, in which 99% or more in diffraction efficiency, the shape transferability is good, and the fluctuation of transmittance due to temperature change is small.

That is, the optical element of the present invention is formed by laminating the optical element comprised of the organic resin of the high refractive index and low dispersion with the inorganic fine particle dispersed and the organic resin of the low refractive index and high dispersion dispersed with the inorganic fine particle with no space provided between thereof. As a result, the diffraction efficiency can be increased, and the distortion due to interface stress can be suppressed, and the change with age of the refraction index difference between organic resins due to the difference between coefficients of water absorption and the difference between coefficients of linear expansion can be reduced.

While the present invention has been described with reference to exemplary Examples, it is to be understood that the invention is not limited to the disclosed exemplary Examples. The scope of the following claims is to be accorded the broadest interpretation so as to encompass all such modifications and equivalent structures and functions.

This application claims the benefit of Japanese Patent Application Nos. 2007-011270, filed Jan. 22, 2007 and 2007-318480, filed Dec. 10, 2007, which are hereby incorporated by reference herein in their entirety.

What is claimed is:

1. A multi-layered diffraction optical element, comprising:
a transparent substrate;
a first layer having a diffraction grating shape at least on one face and comprised of a relatively high refractive index and low dispersion material; and
a second layer having a diffraction grating shape at least on one face and comprised of a relatively low refractive index and high dispersion material,
wherein the first and second layers are laminated on the transparent substrate so that the respective diffraction grating shapes are mutually opposed to each other with no space therebetween, and,
the first layer is comprised of a first organic resin including a first inorganic fine particle, and the second layer is comprised of a second organic resin including a second inorganic fine particle different from the first inorganic fine particle.

2. The multi-layered diffraction optical element according to claim 1, wherein the high refractive index and low dispersion material has a refraction index of d line of 1.54 or more and 1.63 or less and the Abbe number of 44 or more and 57 or less, and, the low refractive index and high dispersion material has a refraction index of d line of 1.48 or more and 1.57 or less and the Abbe number of 14 or more and 28 or less, and, the difference in refraction index of d line between the high refractive index and low dispersion material and the low refractive index and high dispersion material is 0.024 or more and 0.075 or less.

3. The multi-layered diffraction optical element according to claim 2, wherein an average particle size of the first and second inorganic fine particles is 1 nm or more and 100 nm or less.

4. The multi-layered diffraction element according to claim 3, wherein the first inorganic fine particle is comprised of at least one type selected from Al, Zr, Y, Ga, La, and oxides and composites thereof, and has the refraction index of d line thereof of 1.70 or more and 2.5 or less, and the Abbe number of 30 or more and 90 or less.

5. The multi-layered diffraction optical element according to claim 3, wherein a volume content of the first inorganic fine particle in the first layer is 1 to 29 vol %.

6. The multi-layered diffraction optical element according to claim 2, wherein the second inorganic fine particle is a transparent conductive substance.

7. The multi-layered diffraction optical element according to claim 6, wherein the transparent conductive substance is ITO.

8. The multi-layered diffraction optical element according to claim 1, wherein the organic resin included in the first and second layers is comprised of at least one type selected from acrylic resin, vinyl resin, and epoxy resin.

9. The multi-layered diffraction optical element according to claim 8, wherein the organic resin included in the first and second layers is comprised of an ultraviolet-curing resin.

* * * * *